United States Patent [19]

Ohta et al.

[11] Patent Number: 4,641,156

[45] Date of Patent: Feb. 3, 1987

[54] RECORDING APPARATUS WITH DOUBLE FREQUENCY DRIVEN LIQUID CRYSTAL SHUTTER

[75] Inventors: Morio Ohta; Shizuo Tsuchiya; Yoshito Nakano; Masaru Aikawa; Seiji Asaumi, all of Musashimurayamashi, Japan

[73] Assignees: Casio Computer Co., Ltd.; Casio Electronics Manufacturing Co., Ltd., both of Tokyo, Japan

[21] Appl. No.: 650,521

[22] Filed: Sep. 14, 1984

[30] Foreign Application Priority Data

Dec. 30, 1983 [JP] Japan ............................... 58-249054
Jan. 23, 1984 [JP] Japan ................................. 59-8607
May 31, 1984 [JP] Japan ............................... 59-111955

[51] Int. Cl.⁴ ........................................... G01D 15/14
[52] U.S. Cl. ............................... 346/160; 350/331 T; 350/346
[58] Field of Search ................. 350/346, 333, 331 T; 346/160, 107 R

[56] References Cited

U.S. PATENT DOCUMENTS 4,231,035 10/1980 Van Doorn et al. ........... 350/346 X
4,236,150 11/1980 Chern ........................... 350/331 T X
4,386,836 6/1983 Aoki et al. ...................... 350/346 X

FOREIGN PATENT DOCUMENTS 57-171378 10/1981 Japan .

Primary Examiner—Harold Broome
Assistant Examiner—Patrick W. Foster
Attorney, Agent, or Firm—Sandler & Greenblum

[57] ABSTRACT

In the recording apparatus of this invention, liquid crystal light shutter operates by using the double frequency drive. The double frequency drive utilizes signals of a high frequency $f_H$ and lower frequency $f_L$. The dielectric anisotropy of liquid crystal matrial becomes positive in the case of the frequency $f_L$ lower than crossover frequency $f_C$ and becomes negative in the case of the frequency $f_H$ higher than the frequency $f_C$. When the data signal including the signal of the frequency $f_L$ for a final period of a writing cycle Tw, is applied to write selection electrodes and data signal electrodes, liquid crystal light shutter is kept open for the final period of the writing cycle Tw, namely, opening or closing state of the shutter which is caused during a selection period can be eliminated.

10 Claims, 107 Drawing Figures

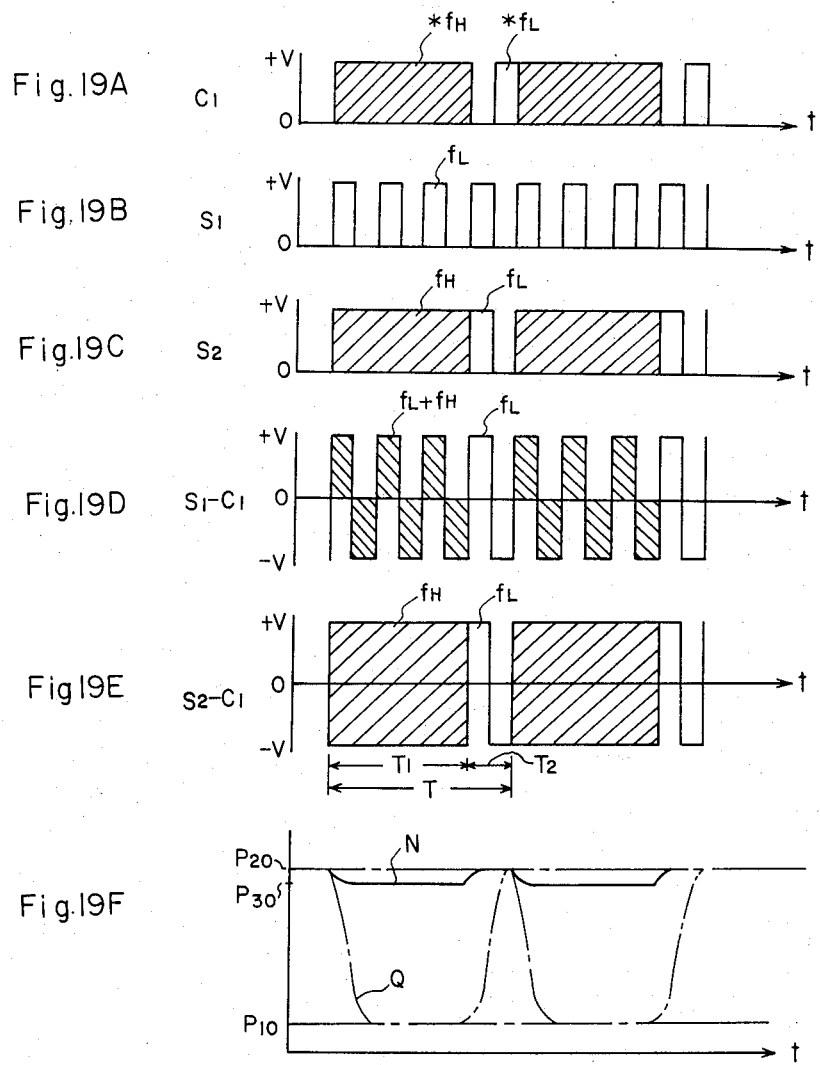

Fig. 26
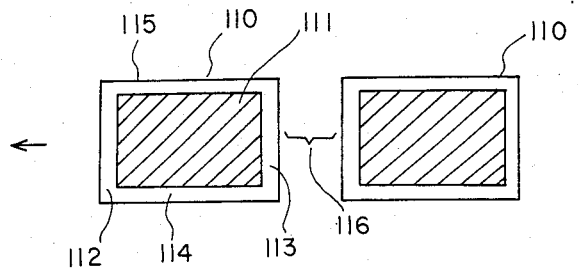
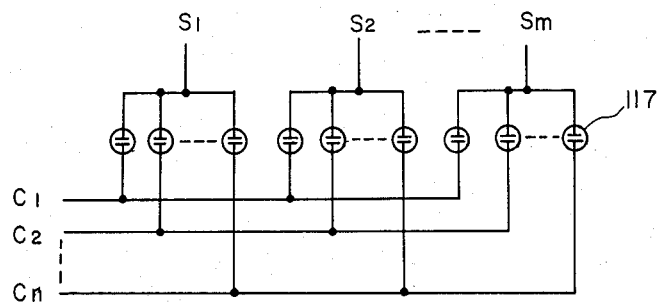
Fig. 27A
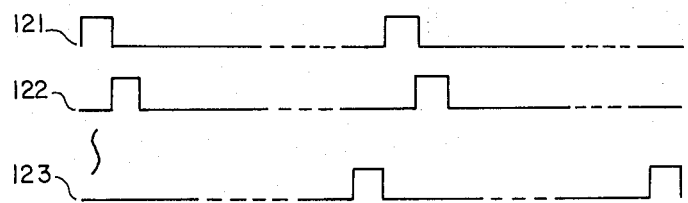
Fig. 27B
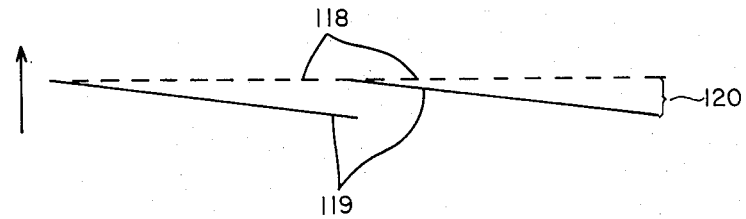
Fig. 27C

FIG. 37
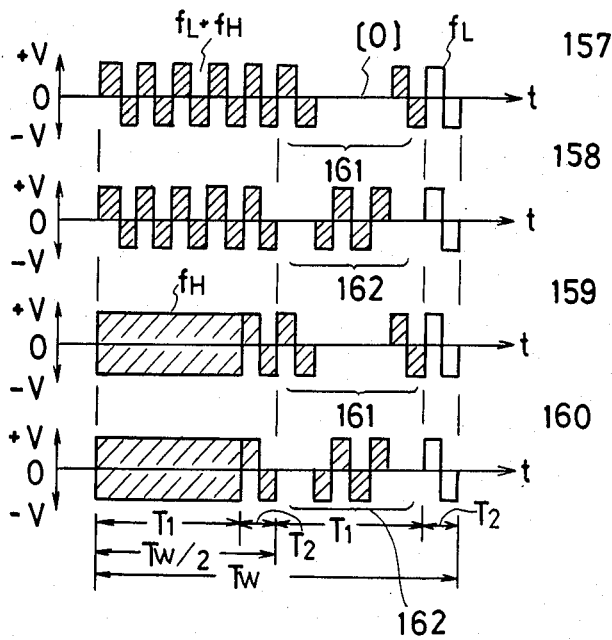
FIG. 38
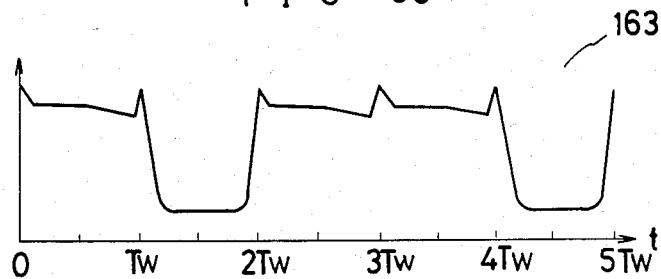
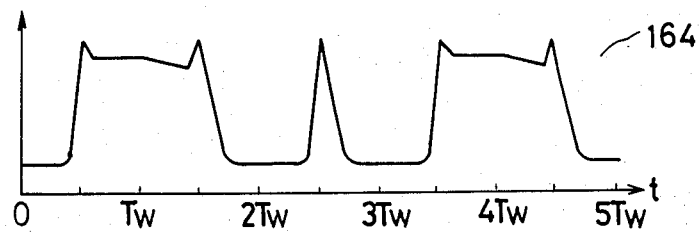

FIG. 40
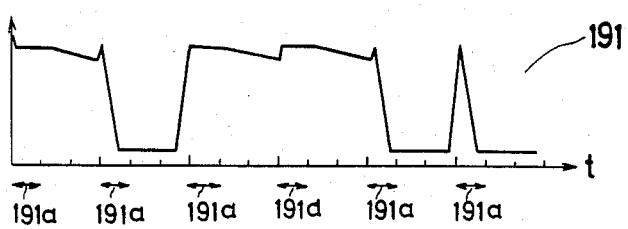
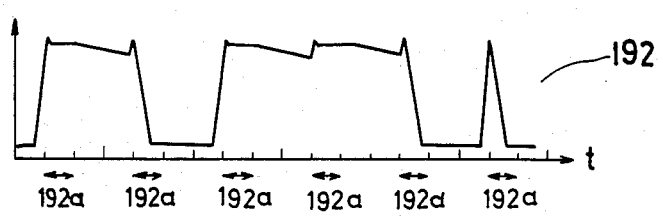
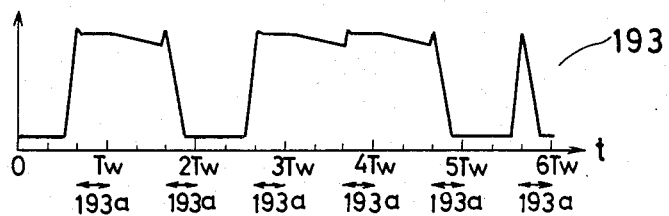
FIG. 41
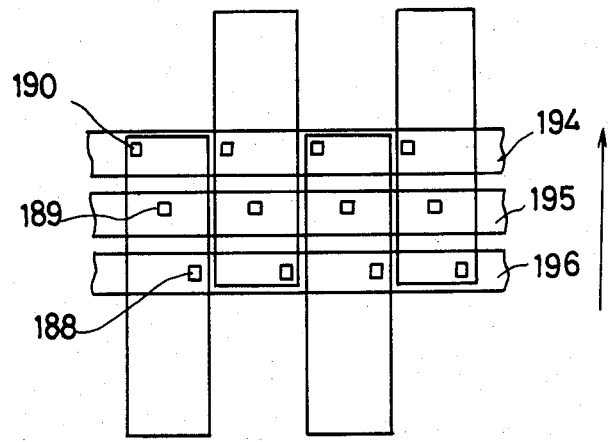

RECORDING APPARATUS WITH DOUBLE FREQUENCY DRIVEN LIQUID CRYSTAL SHUTTER

DETAILED DESCRIPTION OF THE INVENTION

This application is related to pending application Ser. No. 649,851 filed Sept. 11, 1984 in the name of OHTA et al. entitled RECORDING APPARATUS.

1. Field of the Invention

The present invention relates to a recording apparatus wherein liquid crystal light shutters are employed in the optical recording section to use electric optical effect and, more particularly, it relates to the drive for the liquid crystal light shutters of the time division or time sharing as well as the shape thereof.

2. Prior Art

The impact printer which performs mechanical printing by striking the ribbon on a sheet of paper has been regarded for a long time as the typical terminal equipment for computer outputs. This impact printer is excellent in printing quality and has high reliability. However, it can not meet the heeds of customers sufficiently in its recording speed and density because the amount of information has increased remarkably these days.

On the contrary, the non-impact printer which does not perform mechanical printing but produces images by static or heat sensitive developing can achieve high density recording easily since recording can done in free format. The recording method achieved by this non-impact printer includes optical, magnetic, static, heat recordings and the like, and the optical recording method is the best to meet wide use including from low to high speed.

In the case of this optical recording method, light converter elements such as laser, OFT, LED and LCD are used to write image information on the light conductive recording body, but the optical scanning system is complicated and expensive and there is a problem in stabilizing laser light outputs in the case of using the laser. When OFT is used, it is difficult to make the apparatus small-sized. When LED is employed, the productivity of monolithic LED array is low and the irregularity of light outputs is large.

When the laser and LED are employed, their emission wavelengths are nearly in a range of 630-820 nm and shifted from the spectral sensitivity range of the light conductive recording body. Therefore, lack of sensitivity of the light conductive recording body always becomes a problem. When the sensitivity of the light conductive recording body is increased on the side of long wavelength, the light conductive recording body becomes sensitive to environmental conditions such as temperature change.

Therefore, the art of using the liquid crystal as the optical recording means has been studied.

The liquid crtstal light shutter which uses the liquid crystal as the optical recording means is of guest-host type (which will be hereinafter refereed to as GH type or GH effect mode) and of twisted-nematic type (which will be hereinafter referred to as TN type or TN effect mode), and its operation principle will be described below referring to FIG. 1.

FIGS. 1A and 1B are intended to explain the mode of GH effect mode, while FIGS. 1C and 1D the mode of TN effect mode. A liquid crystal cell 1 of GH effect mode is formed by disolving a dye, which is the guest, in a double-frequency driving liquid crystal, which is the host, and comprises sandwiching the liquid crystal material in which the dichroic dye of p effect mode has been solved between transparent electrodes on the glass or the like and arranging liquid crystal particles 2 in homogeneous order.

A liquid crystal light shutter 4 comprises arranging a sheet of polarizing plate 3 relative to the liquid crystal particles 2 in the liquid crystal cell 1 of GH effect mode thus formed, in such a way that their polarizing axes become parallel to one another. In FIG. 1A, incident light 5 is linearly polarized by the polarizing plate 3 and enters into the liquid crystal cell 1 of GH effect mode. Dye particles 6 change their arrangement, associating with the liquid crystal particles 2. Since the dichroic dye of p type absorbs light in the direction of its long axis more than in the direction of its short axis, almost all of polarized light 7 which enters into the dye particles 6 arranged parallel to one another along the liquid crystal particles 2 is absorbed by the dye particles 6 in a case where the incident light 5 is monochromatic having same wavelength as the absorbing one of the dichroic dye of p type, thereby emitting almost no light. Therefore, the liquid crystal light shutter 4 is under the state of its being closed.

On the contrary, the liquid crystal particles 2 are arranged vertically under the state of applying low frequency voltage or under the state shown in FIG. 1B and the dye particles 6 are therefore arranged vertically, associating with the liquid crystal particles 2. Therefore, the polarized light 7 is not absorbed and is emitted almost as it is. The liquid crystal light shutter 4 is under the state of its being opened.

A liquid crystal cell 9 of TN type shown in FIGS. 1C and 1D comprises sandwiching the liquid crystal material, which is formed by disolving a rotatory agent in the double-frequency driving liquid crystal, between the transparent electrodes, and twisting liquid crystal particles 10 between both electrodes by 90 degrees. A liquid crystal light shutter 13 comprises arranging polarizing plates 11 and 12 at the both sides of this liquid crystal cell 9 of TN type. The liquid crystal cell 9 of TN type has such nature that its particles line up in the direction of electric field when low frequency voltage is applied to its liquid crystal layer, and that they return to their original state when high frequency voltage is applied or electric field is cancelled. In FIG. 1C, incident light 14 is linearly polarized by the polarizing plate 11 and enters into the liquid crystal cell 9 of TN type. In a case where no low frequency voltage is applied, namely, the liquid crystal particles 10 are twisted by 90 degrees, the liquid crystal cell 9 has a spectral activity of 90 degrees and the polarized face of output light 15 emitted from this liquid crystal cell 9 of TN type is therefore rotated by 90 degrees, and the output light 15 thus rotated at its polarized face then enters into the polarizing plate 12. Since the polarized face of the output light 15 is parallel to the polarizing axis of the polarizing plate 12 in this case, the output light 15 can pass through the polarizing plate 12, from which light 16 is thus emitted. Therefore, the liquid crystal light shutter 13 is under the state of its being opened.

In a case where low frequency voltage is applied as shown in FIG. 1D, namely, the liquid crystal particles 10 are lined up in the direction of electric field, the output light 15 which is not rotated at its polarized face is emitted from the liquid crystal cell 9 and becomes therefore perpendicular to the polarizing axis of the polarizing plate 12, so that the output light 15 cannot pass through the polarizing plate 12. Accordingly, the liquid crystal light shutter 13 is under the state of its being closed.

The liquid crystal light shutters which are closed and opened as described above are operated by double-frequency drive which will be described below.

Dielectric anisotropy $\Delta\epsilon$ of the double-frequency-driven liquid crystal will be described referring to FIG. 2. The dielectric anisotroy can be expressed by $\Delta\epsilon = \Delta\epsilon_1 - \Delta\epsilon_2$, using the dielectric constant (which will be hereinafter referred to as $\Delta\epsilon_1$) in the long axis direction of liquid crystal particles and the dielectric constant (which will be hereinafter referred to as $\Delta\epsilon_2$) in a direction perpendicular to the long axis direction of liquid crystal particles. The liquid crystal particles are oriented parallel to electric field when $\Delta\epsilon > 0$, while they are oriented vertical to electric field when $\Delta\epsilon > 0$.

Frequency at the time of $\Delta\epsilon = 0$ is called crossover frequency (which will be hereinafter referred to as $f_C$). In the case of frequencies (which will be hereinafter referred to as $f_L$) lower than $f_C$, therefore, $\Delta\epsilon = \Delta\epsilon L$, showing positive anisotroy, while in the case of frequencies (which will be hereinafter referred to as $f_H$) higher than $f_C$, $\Delta\epsilon = \Delta\epsilon H$, showing negative dielectric anisotropy. As described above, the liquid crystal particles can be oriented parallel to electric field when a signal of $f_L$ is applied, while they are oriented vertical to electric field by a signal of $f_H$. This can be used to drive the liquid crystal light shutter opened and closed, as already described referring to FIG. 1.

The liquid crystal light shutter must be high in contrast as comparing the time of its being opened with the time of its being closed.

Light modulating characteristic will be described using the liquid crystal light shutter 4 provided with the liquid crystal cell 1 of GH type and a sheet of the polarizing plate 3, as shown in FIGS. 1A and 1B, and referring to FIGS. 3 and 4.

FIG. 3 shows an absorbed and polarized spectrum of the GH type cell which is a liquid crystal material in which dichroic dye of type is solved. B1 and B2 represent absorbances obtained when linear polarizing light is entered parallel and perpendicular to the director of the homogeneously-oriented liquid crystal in which the dye is disolved. Dichroic ratio CR of the dichroic dye can be expressed by CR=B1/B2 and contrast ratio becomes higher as CR becomes larger. Therefore, B1 becomes largest at a frequency $\lambda m$ in FIG. 3 and the dye shows its absorption is largest. FIG. 4 shows spectral characteristics obtained when the liquid crystal light shutter of GH type is arranged as shown in FIGS. 1A and 1B. C1 and C2 in FIG. 4 represent spectral characteristics corresponding to FIGS. 1A and 1B, wherein C1 is a transmittance obtained when the liquid crystal particles 2 are arranged in homogeneous orientation and C2 a transmittance or a penetration ratio obtained when the liquid crystal particles 2 are in homeotropic orientation. It will be hereinafter esteemed that the states shown in FIG. 1A and by C1 in FIG. 4 show the liquid crystal cell turned off and that the states shown in FIG. 1B and by C2 in FIG. 4 show the liquid crystal cell turned on. Similarly, it will be hereinafter esteemed that the liquid crystal cell 9 of TN type shown in FIG. 1C is under the off-state and that the liquid crystal cell 9 shown in FIG. 1D is under the on-state.

As shown by C1 in FIG. 4, the transmittance becomes smallest P1 at the point of the wave length $\lambda m$ when the liquid crystal cell is turned off, and this is the transmittance obtained when the liquid crystal light shutter 4 is closed. P2 represents the transmittance at the point of $\lambda m$ when the liquid crystal cell is turned on, and this is the transmittance obtained when the liquid crystal light shutter 4 is opened.

Dyes usually tend to become deteriorated when they are exposed to light of short wavelength, particularly to ultraviolet rays, and this can be solved when the polarizing plate 3 has ultraviolet ray cutting characteristic. C1 and. C2 in FIG. 4 represent spectral transmittances obtained when a polarizing plate having the ultraviolet ray cutting characteristic is employed, while D1 and D2 in FIG. 4 denote spectral transmittances of the liquid crystal light shutter obtained when a polarizing plate having no ultraviolet cutting characteristic is employed. This is the reason why it is preferable that the polarizing plate 3 in FIGS. 1A and 1B is positioned on the side of light incident upon the liquid crystal cell 1 of GH effect mode, that is, on the side of the light source.

As shown in FIG. 4, the transmittance of the liquid crystal light shutter which comprises the liquid crystal cell of GH effect mode depends upon wavelength largely. It is therefore desirable that the polarizing light 7 is a ray of light having as narrow spectrum as possible. Aluminate fluorescent lamp is a light source to meet this purpose and FIG. 5 shows its spectral distribution characteristic. It is possible in this case to provide the polarizing plate 3 with such characteristic that can cut rays except a ray of light having its peak near 480 nm, and if so, the contrast ratio can be enhanced as apparent from FIG. 4. If any problem is present from the viewpoint of the characteristic of a shutter, a filter may be added to cut rays of light on the side of long wavelength.

The flat portion of the spectral transmittance characteristic shown in FIG. 4 can be widened by providing the polarizing plate with the ultraviolet ray cutting characteristic and adding plural dyes which have largest absorption in relation to wavelengths having other spectral peaks and whose wavelengths are different from each other.

Although the liquid crystal light shutter has been described about its adaptable conditions between the light source and the cell of GH type, its other adaptable conditions will be described in relation to the photoreceptor on which optical writing is recorded in the form of static latent images.

Various kinds of materials such as those belonging to selenium (Se), cadmium sulfide (CdS), and zinc oxide groups are used as the photosensitive body or photoreceptor. In the case of the optical recording using the laser and LED medium, its liqht-emitting wavelength is in the vicinity of long wavelength, as described above, and the photoreceptor becomes low in sensitivity in the vicinity of this long wavelength. Therefore, this makes it necessary to increase the sensitivity of the photoreceptor, thereby causing the process to be complicated. Since the liquid crystal light shutter of GH effect mode which has been described above can select the light source and dye and determine a wavelength suitable for the characteristic of the photoreceptor, the photoreceptor which has been used by the copying machine of electrophotograph type can be employed, thereby allowing other electrophotographic processes to be used as they are.

The transmittance P1 at the wavelength in FIG. 4 ahd when the liquid crystal light shutter is turned off is determined by the polarizing ratio of the polarizing plate 3 and the absorbance B1 of the dye, while the transmittance P2 when the liquid crystal light shutter is turned on is determined by the transmittance of the polarizing plate 3, absorbance B2 of the dye, and so on. The curves C1 and C2 in FIG. 4 are shifted up and down, depending upon the transmittance of the polarizing plate 3 and density of the dye. Since the contrast depends upon transmittance, the dichroic ratio $CR=B1/B2$ of the dye is an important factor.

The contrast ratio of the liquid crystal light shutter 13 which comprises the liquid crystal cell 9 of TN type shown in FIGS. 1C and 1D will be described below.

The contrast ratio in this case does not depend upon the liquid crystal cell of TN type, but it is determined by the polarizing plates 11 and 12. FIG. 6 shows spectral characteristics of the liquid crystal light shutter which comprises the liquid crystal cell of TN type. Curves E1 and E2 correspond to FIGS. 1C and 1D, respectively, and the curve E1 represents the spectral transmittance characteristic when the liquid crystal cell is under the off-state, while the curve E2 the spectral transmittance characteristic when the liquid crystal cell is under the on-state.

Since the liquid crystal is an organic material, it is preferable that the polarizing plate 11 is provided with the ultraviolet ray cutting characteristic. The liquid crystal light shutter of TN type has the advantage of re-using a light source which has wider wavelength, as compared with the liquid crystal light shutter of GH type.

A focussing lens which is interposed between the liquid crystal light shutter and the photoreceptor will be described.

The liquid crystal light shutter 4 and focussing lens are needed to have an effective length of about 300 mm so as to achieve recording, using sheets of paper which have a large size of A3. Selfoc lens (made by Japan Plate Glass Corporation) is suitable for this focussing lens. The Selfoc lens has larger color aberration as it becomes brighter, and the conjugate length of the lens changes remarkably depending upon wavelength. Therefore, no problem is caused in the case of the liquid crystal light shutter of GH type, but it is preferable in the case of the liquid cystal light shutter of TN type that a light source similar to monochromatic light is employed or that the light is converted to monochromatic light by means of the filter and the like.

Differences between the liquid crystal light shutters of GH and TN types which have been described above will be explained.

The liquid crystal light shutter 4 of GH type is a light shutter of normally-off type which is turned off (or closed) at the time of silent signal and signal $f_H$ added, as shown in FIG. 1A, and which is turned on (or opened) at the time of signal $f_L$ added.

On the other hand, the liquid crystal light shutter 13 of TN type is a light shutter of normally-on type which is turned on at the time of silent signal and signal $f_H$ added, as shown in FIG. 1C, and which is turned off at the time of signal $f_L$ added, as shown in FIG. 1D. Therefore, the liquid crystal light shutter of TN effect mode performs operation quite reverse to that of the liquid crystal light shutter of GH effect mode.

The viscosity of a liquid crystal agent contained in the liquid crystal light shutter changes depending upon temperature whichever may be used, the liquid crystal light shutter of GH type or TN type. Therefore, the dielectric anisotropy shown in FIG. 2 is influenced by viscosity and thus changes largely depending upon temperature. When temperature rises and viscosity falls, $f_C$ becomes high and the characteristic $\Delta\epsilon$ in FIG. 2 is shifted right or toward the side of high frequency. More specifically, when temperature rises from 20° C. to 40° C., $f_C$ rises from 5 KHz to 46 KHz It is assumed in FIG. 2 that the liquid crystal cell is turned on and off under room temperature by signals $f_L$ and $f_H$, $\Delta\epsilon$ on the side of $f_H$ becomes smaller as temperature rises, and the off-side condition of the liquid crystal cell becomes severer.

If viscosity is low, the movement of liquid crystal particles becomes quicker to achieve high speed response. It is therefore necessary to use the liquid crystal light shutter under a little raised temperature. In addition, the liquid crystal light shutter or liquid crystal agent is heated by the light source. It is therefore necessary from the viewpoint of temperature control that an appropriate region of temperature is determined ranging from 40° C. to 65° C.

In the case of the conventional recording apparatus as described above, the shutter section of the liquid crystal light shutters which are driven to achieve opening and closing actions is formed by a plurality of micro-shutters, the micro-shutters cause the liquid crystal light shutters to be irradiated with light from the light source, each of the micro-shutters is closed and opened according to image information, and the light conductive recording body is irradiated with light, which has passed through the opened micro-shutters, to form latent images. The plural micro-shutters are divided into n groups and time sharing drive is carried out by group selecting signals $A_1-A_n$, as shown in FIG. 7, so that the micro-shutters in each of n groups can be opened and closed only for a selection period but closed for non-selection period.

Problems of Prior Art

In the case of the time sharing drive as described above, time sharing number, writing cycle and the like are determined by the response speed of liquid crystal elements, energy strength of light source, number of drivers, and the like.

When the n-time sharing drive is to be carried out, the period which is assigned to the selected group is shorter than Tw/n, providing that the writing cycle is Tw. When the n-time sharing drive is applied to the liquid crystal light shutters according to the conventional manner, therefore, the time during which each of the micro-shutters is opened becomes shorter than 1/n and the amount of exposure which is applied to the photoreceptor becomes less than 1/n at the same time, so that lack of luminous energy is cause, although the speed of writing images becomes faster as the number n of time division becomes larger.

When $f_L$ and $f_H$ are fixed, the value of $f_C$ changes according to the temperature change of liquid crystal, thereby causing the recording apparatus to be wrongly operated. Therefore, the temperature of liquid crystal must be held with high accuracy.

Further, the shape of the conventional micro-shutters is suitable for use to the static recording body, but it is not intended for the dynamic recording body which has a writing cycle. In the case of the optical recording apparatus which uses the micro-shutters the amount of light irradiation relative to the photoreceptor is small and the on-off operation of the micro-shutters must be therefore controlled almost all over the writing cycle. In a case where the recording body itself moves by one picture element during the time of writing one picture element line on the recording body and particularly a black dot (image element which is not irradiated with light because the shutter is closed) is isolated among white dots (picture elements which are irradiated with light because the shutters are opened), the black dot is influenced by the light of the white dots and becomes different in density when it is compared with those black dots which are arranged successively one another, thereby making the reproduction of image elements incomplete.

OBJECT OF THE INVENTION

The present invention is intended to eliminate the above-mentioned drawbacks, and the object of the present invention is therefore to provide a recording apparatus wherein the n-time division drive is controlled to hold the recording condition at the selection time assigned till the non-selection period and also to become substantially similar to the operation of the static drive, whereby the time during which each of the micro-shutters is opened is not reduced, the liquid crystal light shutters can be prevented from leaking light because of temperature change, the reproducing capacity of one picture element can be enhanced, a block dot among white dots cannot be made different in density from those black dots which are successively arranged one another, and recording accuracy can be thus enhanced.

The object of the present invention can be achieved by a recording apparatus comprising a recording apparatus for performing an optical writing on a photoreceptor in correspondence with image signals to be recorded comprising liquid crystal light shutter having a first transparent substrate provided with n units of write selecting electrodes, a second transparent substrate provided with plural signal electrodes which cross the n-unit of the write selecting electrodes, and a liquid crystal agent sealed between the both substrates and whose dielectric anisotropy becomes zero at a specified frequency $f_C$, wherein those portions of said both electrodes which are crossed and opposed one another form micro-shutters;

a light source for irradiating light to the liquid crystal light shutters; and a driver means has means for supplying write selecting signals which have frequencies higher and lower than the specified frequency $f_C$, and which are successively different in phase, to the n-unit of the write selecting electrodes, and means for supplying recording signals, which have higher and/or lower frequencies $f_H$ and $f_L$ than the specified frequency $f_C$, to the signal electrodes on the basis of image signals, and serving to render each of the micro-shutters on or off responsive to the recording signals during a selection period in which the micro-shutters are selected by the write selecting signals, and to render each of the micro-shutters to substantially maintain the on or off state thereof in the preceding selection period during a non-selection period in which no micro-shutter is selected by the write selecting signals.

BRIEF DESCRIPTION OF THE DRAWINGS

FIGS. 19A through 19F and FIGS. 20A through 20F are waveforms intended to explain in more detail those driving examples which are used by the present invention.

FIG. 26 is a view intended to explain the control for effective image area on a recording paper.

FIGS. 27A, 27B and 27C are intended to explain n-time division drive.

FIGS. 33A and 33B through 36A and 36B are waveform diagrams intended to explain the write selecting signal in the case of the 2-time sharing drive according to the present invention.

FIG. 37 is a waveform diagram showing a drive signal.

FIG. 38 is a waveform diagram showing light response characteristic in the case of employing the drive shown in FIG. 37.

FIG. 40 is a waveform diagram showing the light response characteristic in the case of a 3-time division drive according to the present invention.

FIG. 41 shows the arrangement of micro-shutters according to the present invention.

EMBODIMENT OF THE INVENTION

A first embodiment of the present invention will be described referring to the accompanying drawings.

The recording operation of liquid crystal light shutter which serves as a recording means for image information and in which a liquid crystal is used will be described at first in reference to FIGS. 8 through 10.

Figure 1A:
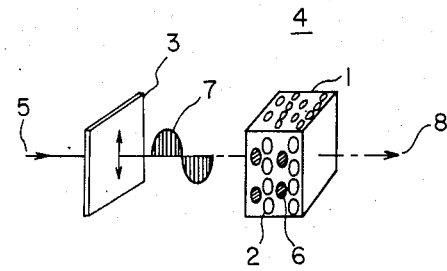
FIGS. 1A and 1B show operation modes of liquid crystals of GH effect mode, while FIGS. 1C and 1D those of liquid, crystal of TN effect mode.
Figure 1B:
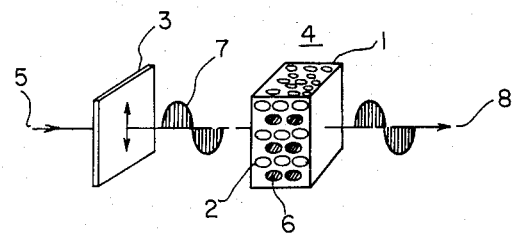
Figure 1C:
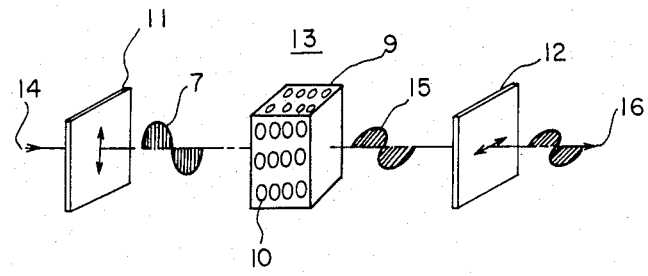
Figure 1D:
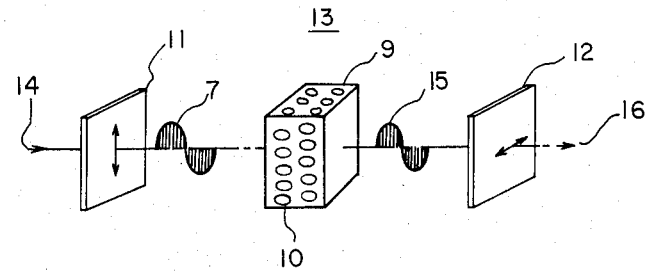
Figure 2:
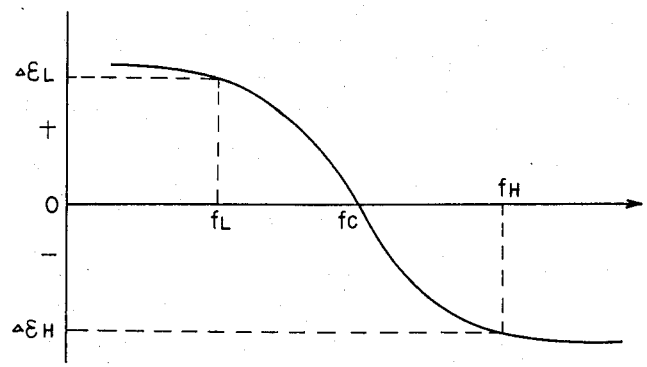
FIG. 2 is a characteristic view showing the dielectric anisotropy of a double-frequency-driven liquid crystal.
Figure 3:
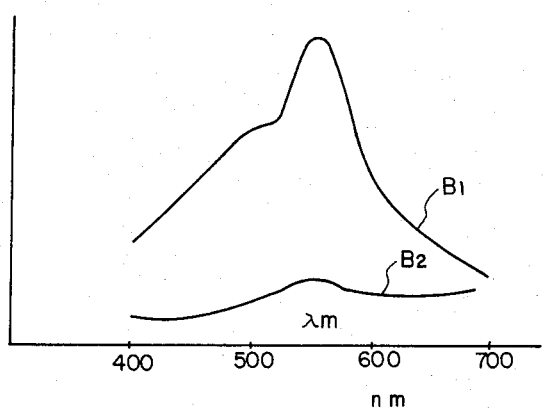
FIG. 3 is a characteristic view showing the absorbance of a liquid crystal in which a dichromatic dye is solved.
Figure 4:
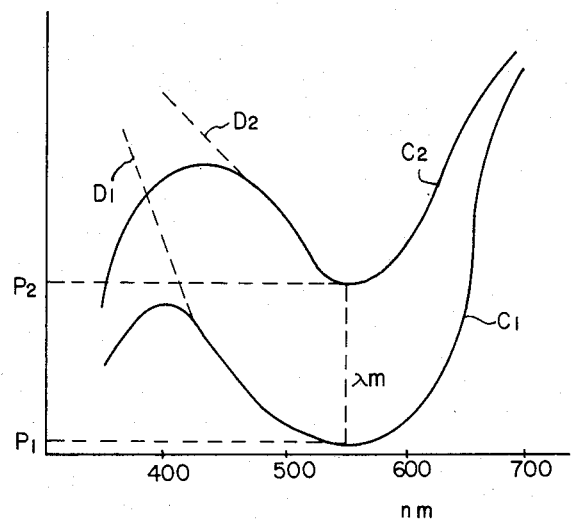
FIG. 4 is a characteristic view showing the spectral transmittance of a liquid crystal shutter of GH type which is employed by the present invention.
Figure 5:
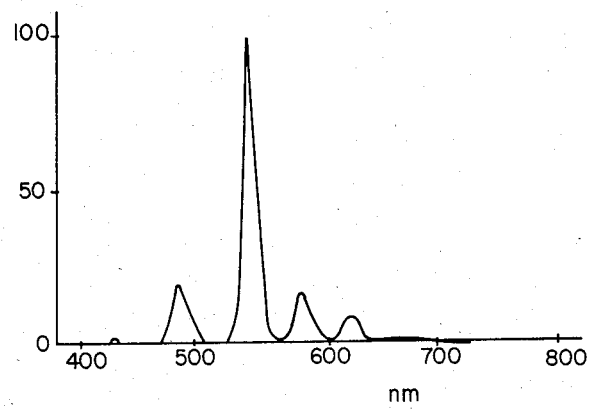
FIG. 5 shows the spectral characteristic of an aluminate fluorescent lamp which is employed by the present invention.
Figure 6:
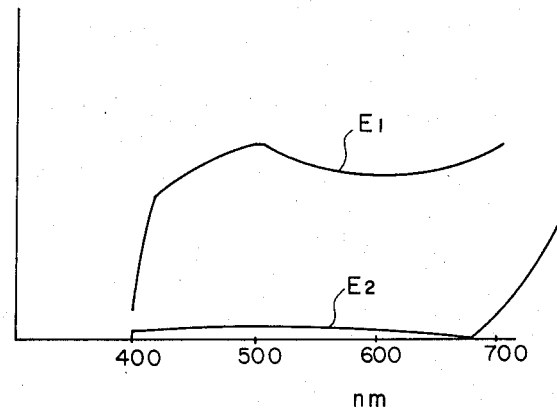
FIG. 6 is a characteristic view showing the spectral transmittance of a liquid crystal light shutter of TN type in which a polarizing plate is provided with ultraviolet ray cutting property.
Figure 7:
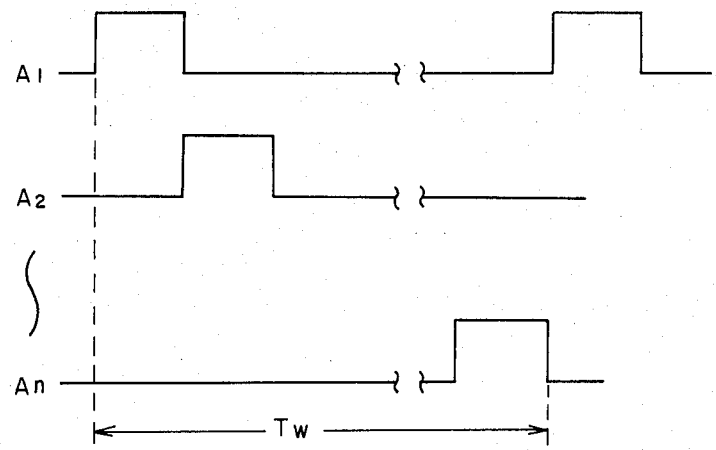
FIG. 7 is a timing chart in the case where the conventional manner of driving the liquid crystal light shutters is employed.
Figure 8:
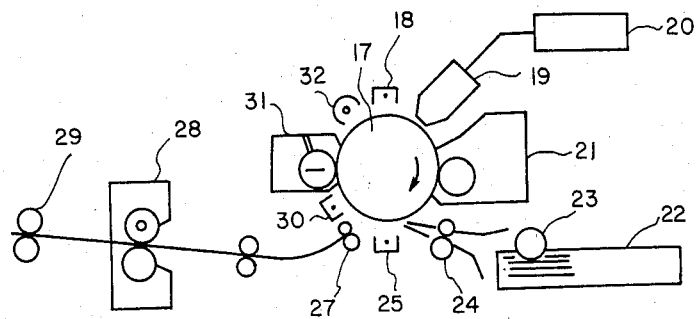
FIG. 8 is a block diagram showing a recording apparatus.

In FIG. 8, the surface of a photosensitive body 17 is previously and uniformly charged by an charged section 18 which is separated by a certain interval from the photoreceptor 17. An optical recording section 19 is driven by a recording control section 20, which serves to control timing and the like responsive to recording information of images, so as to electrically and optically convert the informtion and to perform optical writing on the surface of the photoreceptor 17.

The optical writing on the surface of the photoreceptor 17 is carried out by irradiating light through the optical recording section 19. A static latent image thus formed on the photoreceptor 17 is developed and made visible by toner at a developing section 21 which is arranged adjacent to the photoreceptor 17. A sheet of paper 22 is fed by a paper supply roller 23, temporarily stopped by holding rollers 24, then fed again synchronous with the toner image, and has the toner image transferred thereon at a transferring section 25. The paper 22 is then separated from the photoreceptor 17 at a separating section 27, has the toner image fixed thereon at a fixing section 28 and is discharged outside through paper discharging rollers 29. On the other hand, toner charge on the photoreceptor 17 is neutralized by a charge rejecting section 30 which is arranged adjacent to the photoreceptor 17, and the remaining toner thereon is then cleaned by a cleaning section 31, and surface charge on the photoreceptor 17 is further neutralized by an eraser 32.

Figure 9B:
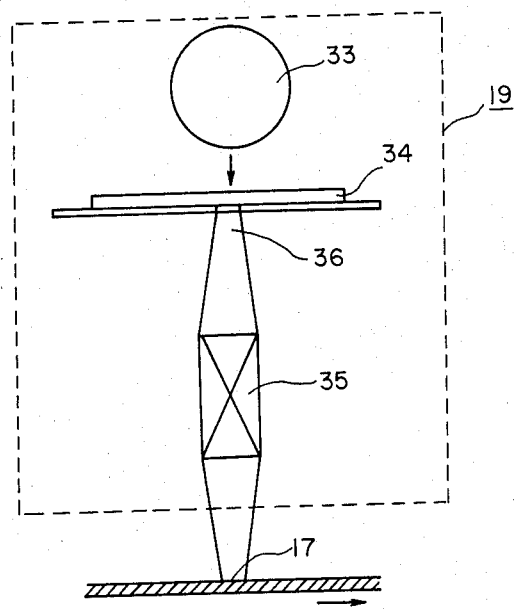
FIGS. 9A and 9B show a liquid crystal shutter section of the recording apparatus.
Figure 9A:
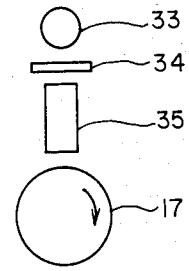

An arrangement of the optical recording section 19 in the recording apparatus which performs the above-described operation is shown in FIG. 9A.

The optical recording section 19 comprises a light source 33, liquid crystal light shutter 34 and focussing lens 35, and light emitted from the light source 33 is irradiated onto the photoreceptor 17 through the liquid crystal light shutter 34 and focusing lens 35. As shown in FIG. 9B, light 36 of the light source 33 passes through the micro-shutters in the liquid crystal light shutter 34 so as to irradiate the photoreceptor 17 which moves in a direction shown by an arrow. As shown in FIG. 10, the liquid crystal light shutter 34 comprises sealing a double-frequency-driven liquid crystal or its mixture between two sheets of glass plates 37a and 37b, and the glass plate 37a is provided with signal electrodes 38a which are alternately arranged at halves of the glass plate 37a, while the glass plate 37b is provided with a common electrode 38b. Each of the micro-shutters 39 is made of transparent electrode such as indium oxide ($In_2O_3$) and tin oxide ($SnO_3$) at those areas of the signal electrodes 38a which are crossed by the common electrode 38b so as to have a necessary size and contour. In the case of the recording apparatus of electrophotographing type, it is usually desirable that recording density is more than 9.4 dots/mm, and it is preferable that the micro-shutters 39 are substantially less than 100 $\mu m°$. The liquid crystal light shutter 34 comprises providing a thus-formed liquid crystal panel 40 with at least on polarizing plate, and it allows the light emitted from the light source 33 to pass through or be shut off by the micro-shutters 39 responsive to a recording signal and to be irradiated onto the photoreceptor 17 through the focussing lens 35.

Figure 10:
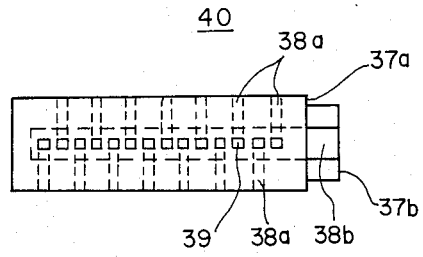
FIG. 10 shows a liquid crystal panel of the recording apparatus.
Figure 11:
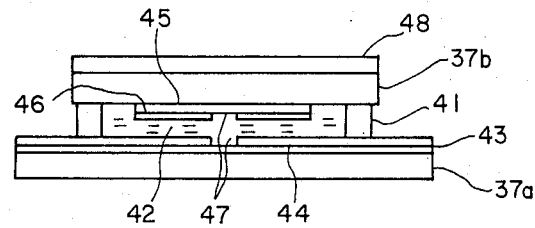
FIG. 11 is a sectional view showing a liquid crystal light shutter of GH effect mode which is employed by the present invention.

FIG. 11 shows in more detail the liquid crystal light shutter 34 in FIGS. 9A, 9B and 10. The two glass plates 37a and 37b are separated from each other by spacers 41 to have a gap between them and a double-frequency-driven liquid crystal mixture 42 is sealed in the gap. The signal electrode 38a is formed by transparent and metal electrodes 43 and 44, while the common electrode 38b by transparent and metal electrodes 45 and 46. The micro-shutter 39 is formed by portions 47 from which the metal electrodes 44 and 46 are removed. The liquid crystal light shutter 34 of GH effect mode is formed by further mounting a polarizing plate 48 on the glass plate 37b.

The operation of the driven liquid crystal light shutter in the case of the recording apparatus arranged as described above will be described below.

Figure 12A:
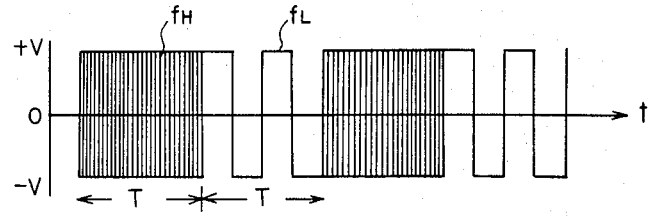
FIGS. 12A through 12D are views intended to explain the fundamentals of response characteristic appearing according to double-frequency drive.
Figure 12B:
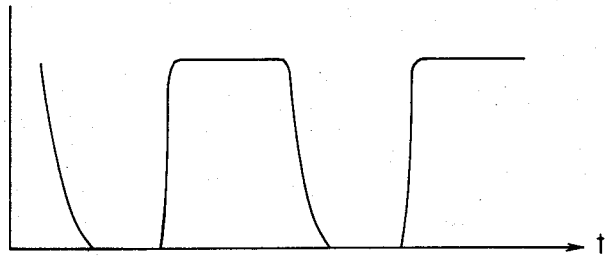

FIGS. 12A through 12D are intended to explain double-frequency drive in more detail, using the liquid crystal light shutter of GH type. FIG. 12A shows a waveform of the liquid crystal light shutter driven by alternating voltage V applied over time period T, using frequencies $f_H$ and $f_L$. FIG. 12B shows the performance of relative photo-transmittance at this time, and its rise time takes longer time than its fall time.

Figure 12C:
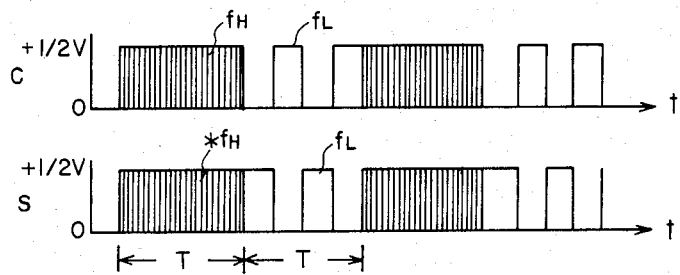
Figure 12D:
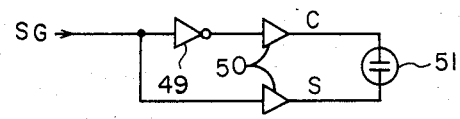

The waveform in FIG. 12A is gained by earthing one electrode of the liquid crystal light shutter while applying the alternating voltage to the other electrode thereof, but this makes the cost of the driver section higher and is not usually employed accordingly. When a signal whose voltage is $\frac{1}{2}$ V and whose phase is S is applied to one electrode while a signal whose voltage is $\frac{1}{2}$ V and whose phase is C reverse to S is applied to the other electrode, as shown in FIG. 12C, in the case where it is used as the usual LCD (or liquid crystal display), the drive shown in FIG. 12A is equivalently caused in the liquid crystal light shutter. It is assumed that $*f_H$ and $*f_L$ are opposite in phase to $f_H$ and $f_L$. FIG. 12D shows a specific circuit for this purpose. SG represents a data signal, 49 an inverter circuit, 50 a high voltage output buffer circuit, and 51 a liquid crystal light shutter.

Figure 13:
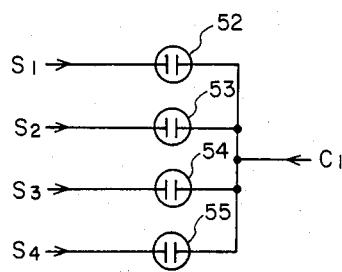
FIG. 13 is a circuit diagram intended to discuss a drive which allows common electrodes to be formed as a unit.

In the case of the practical means as shown in FIG. 10, the plural micro-shutters 39 are connected to the common electrode 38b through the signal electrodes 38a. This is shown by FIG. 13, in which S1–S4 represent segment signals, C1 a common signal and 52–55 the micro-shutters. It is impossible in this case that a signal which is usually opposite in phase to the segment signal is applied to the common signal C1, as shown in FIG. 12C.

Tests were conducted in relation with this matter and their results are shown in FIG. 14. It is assumed for the sake of explaining FIG. 14 that one electrode in FIG. 13 is simply referred to as S while the other as C.

Figure 14A:
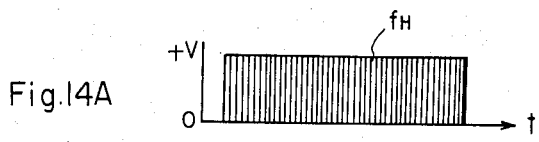
FIGS. 14A through 14G are waveforms showing test examples intended to discuss those driving methods which are employed by the present invention.
Figure 14B:
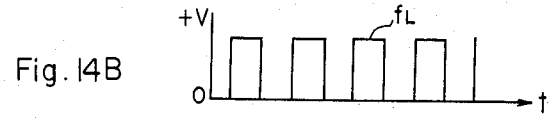
Figure 14C:
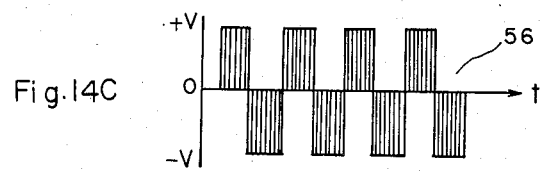
Figure 14D:
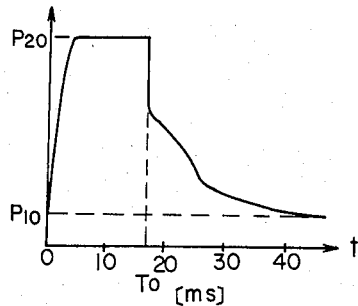
Figure 14E:
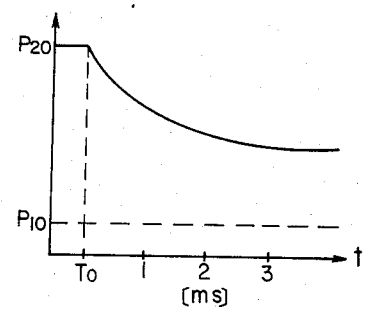

FIG. 14D shows response characteristic gained when the $f_L$ signal shown in FIG. 14B is applied to the electrode S while the $*f_L$ signal which is opposite in phase to the $f_L$ signal is applied to the electrode C, and the electrodes S and C are earthed after the response is stabilized. FIG. 14E shows the trailing portion after time $T_0$ of the curve shown in FIG. 14D with the time scale enlarged ten times that of the scale in FIG. 14D.

Figure 14F:
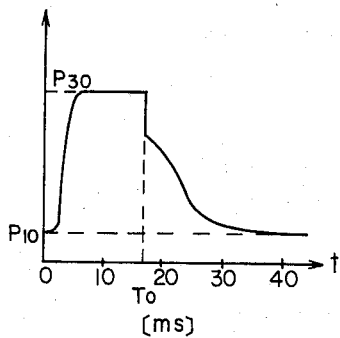
Figure 14G:
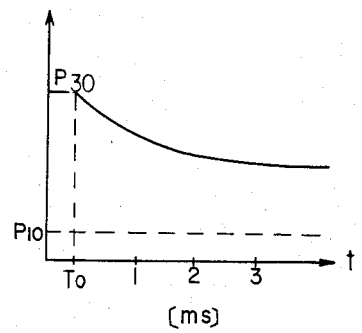

FIG. 14F shows response characteristic gained when the $f_L$ signal in FIG. 14B is applied to the electrode S while the $*f_H$ signal which is reverse in phase to the signal in FIG. 14A is applied to the electrode C, and the electrodes S and C are earthed after the response is stabilized. FIG. 14G shows the trailing portion after time $T_0$ of the curve shown in FIG. 14F with the time scale enlarged ten times that of the scale in FIG. 14F.

Since alternating voltage having a voltage V and a frequency $f_L$ till time $T_0$ is applied in FIG. 14D, the liquid crystal light shutter is opened and becomes stabilized at a photo-transmittance $P_{20}$. Silent signal condition is caused at time $T_0$, but the liquid crystal light shutter is not closed immediately, as apparent from FIGS. 14D and 14E.

In FIG. 14F, a superposed signal 56 of $f_L$ and $f_H$ shown in FIG. 14C is applied and stabilization is provided at a photo-transmittance $P_{30}$. Silent signal condition is caused at time $T_0$ and the performance is as shown in FIGS. 14F and 14G and almost same as that in FIGS. 14D and 14E only except that the fall times from $P_{20}$ and $P_{30}$ are different.

As described above, the liquid crystal light shutter can be opened by the superposed signal of $f_L$ and $f_H$ (which will be hereinafter referred to as $f_L+f_H$ signal) and $P_{30}/P_{20}\times 100=88\%$ as compared with the photo-transmittance at the time of the $f_L$ signal. This is an important matter, which teaches us that the $*f_H$ signal which is opposite in phase to the $f_H$ signal may be applied as the common signal C1 to drive the liquid crystal light shutter according to the manner shown in FIG. 13. Photo-transmittance $P_{10}$ shown in FIGS. 14D through 14G is caused at the time of silent signal or by light leaked when the liquid crystal light shutter is turned off, and this level is substantially equal to that gained when the $f_H$ signal which is an off-signal is successively applied.

Figure 15A:
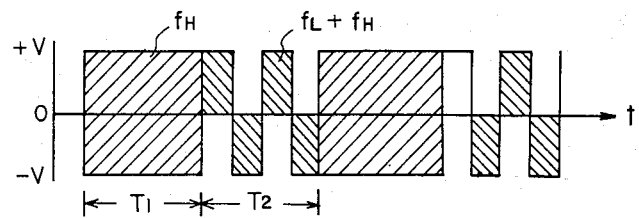
FIGS. 15A, 15B, 16A, 16B, 17A, 17B, 18A, 18B and 18C are waveforms showing those driving examples which are employed by the present invention.
Figure 15B:
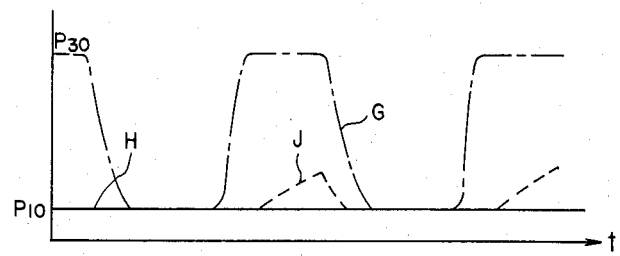

FIGS. 15A and 15B show repeated response of the liquid crystal light shutter caused by the $f_H$ and $f_L+f_H$ signals. The $f_H$ signal is applied for a time $T_1$ while the $f_L+f_H$ signal is applied for a time $T_2$, which is repeated in FIG. 15A. FIG. 15B shows response characteristic gained at this case. A response G represents the case of $T_1+T_2\gg 1$ ms, which is as imagined from the results in FIGS. 14F and 14G which teach us that the $f_L$ signal may be replaced by the $f_L+f_H$ signal. However, when $T_1=T_2=1$ ms, for example, phototransmittance is fixed to level $P_{10}$, as shown by H in FIG. 15B and no on-response is provided. As described above, level $P_{10}$ denotes the phototransmittance gained when the $f_H$ signal is successively applied. When the ration of $T_1$ and $T_2$ is changed to become $T_1<T_2$, a response J is provided and shifted to the side of G. When $T_1=0.5$ ms and $T_2=1$ ms, it approaches level $P_{30}$ at last but quite differs in level from the response G.

It can be said from the above that the $f_L+f_H$ signal immediately after the $f_H$ signal has little effect but gradually-enhanced-effect as the $f_L$ signal. This is an important matter which determines the drive for the liquid crystal light shutter according to the present invention.

Figure 16A:
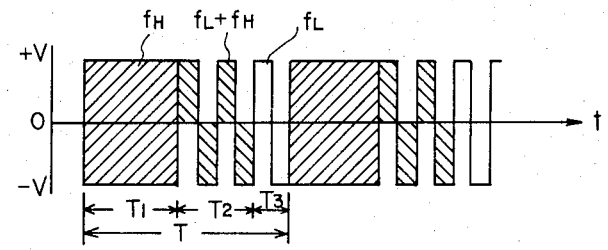
Figure 16B:
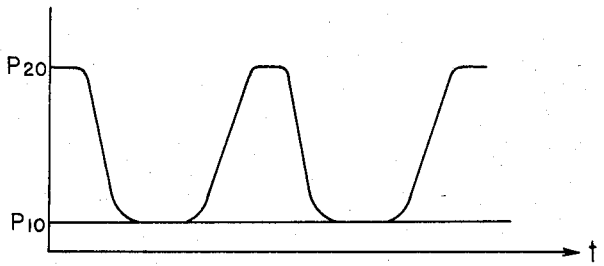

When the $f_L$ signal is applied for a time $T_3$, as shown in FIG. 16A, a response shown in FIG. 16B is provided and accumulation effect caused by the $f_H$ signal can be eliminated. The above have been confirmed under the condition of $T_1=1$ ms, $T_2=0.5$ ms and $T_3=0.2$ ms at V=30, $f_L=5$ KHz, $f_H=300$ KHz and 45° C.

It can be understood that a drive by which good repeated response is gained is achieved by applying the $f_L$ signal within a certain writing cycle, as described above, to open the liquid crystal light shutter.

Figure 17A:
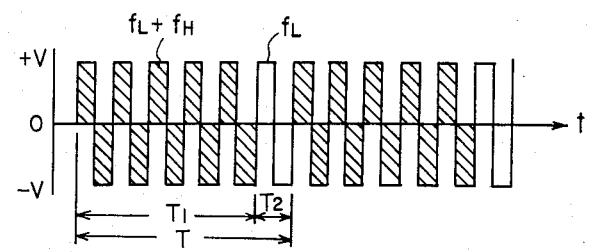
Figure 17B:
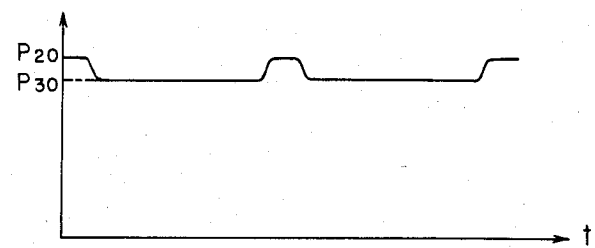

FIG. 17 shows another drive example in which the $f_L$ signal is added within the certain period T while adding the $f_L+f_H$ signal repeatedly. $P_{20}$ and $P_{30}$ correspond to FIG. 14, representing photo-transmittances, respectively, at the time of successively adding the $f_L$ and $f_L+f_H$ signals.

Figure 18A:
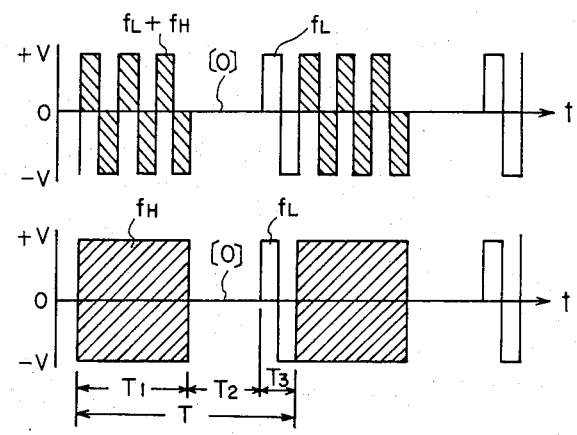
Figure 18B:
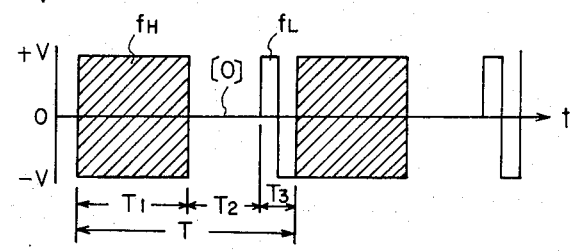
Figure 18C:
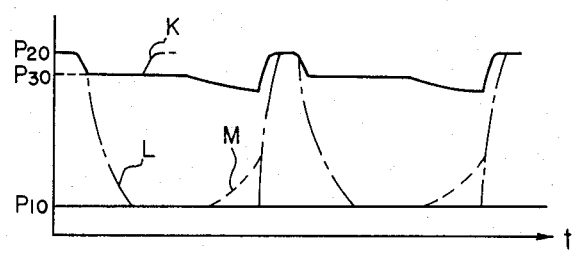
Figure 20A:
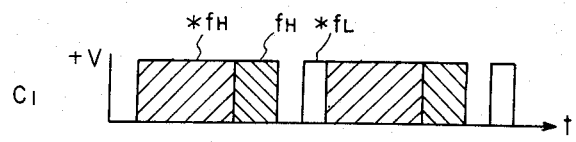
Figure 20B:
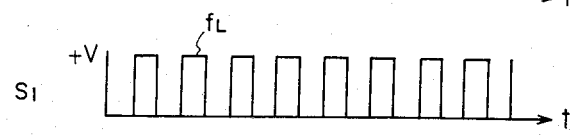
Figure 20C:
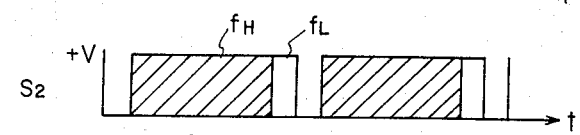
Figure 20D:
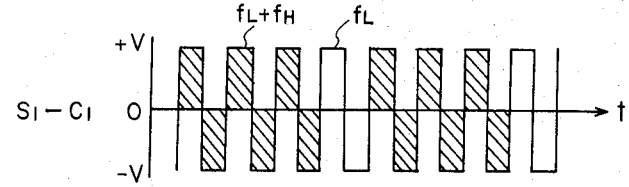
Figure 20E:
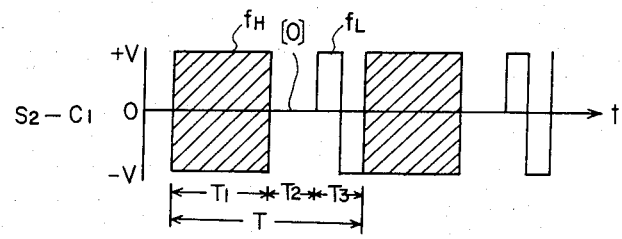
Figure 20F:
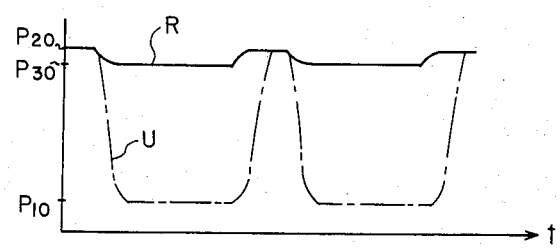

FIG. 18A shows a drive signal which is formed by replacing a part of the $f_L+f_H$ signal with silent signal, FIG. 18B a drive signal which is formed by replacing a part of the $f_H$ signal with silent signal, and FIG. 18C response characteristic gained by these drive signals. The silent signal portion will be hereinafter represented by [0].

The response gained by the drive signal in FIG. 18A is represented by K in FIG. 18C, and the photo-transmittance is lowered, as shown in FIGS. 14F and 14G, for period $T_2$ during which the [0] signal is applied, but if $T_2$ is sufficiently short, the photo-transmittance shows no large reduction. Needless to say, the $f_L + f_H$ or $f_L$ signal may be applied for period $T_2$. The response gained by the drive signal in FIG. 18B is denoted by L in FIG. 18C, and since the liquid crystal light shutter has been already closed for period $T_2$ during which the [0] signal is applied, it holds its closed condition. It goes without saying that the $f_H$ signal may be applied during period $T_2$. When the $f_L + f_H$ signal is applied, similarly to the case in FIG. 16A, for period $T_2$ in FIG. 18B, the photo-transmittance rises more quickly as shown by M in FIG. 18C. This teaches us that the almost closed state of the liquid crystal light shutter can be held by combining the [0] signal with the $f_L + f_H$ signal, and this state can be effectively used when the time division drive of the present invention is to be carried out.

FIGS. 19A–19F show a common signal $C_1$, segment signals $S_1$, $S_2$, signals $S_1-C_1$ and $S_2-C_1$ applied to the liquid crystal light shutter, and responses N and Q gained by these signals $S_1-C_1$ and $S_2-C_1$ in the case of no [0] signal present, while FIGS. 20A–20F show the common signal $C_1$, segment signals $S_1$, $S_2$, signals $S_1-C_1$ and $S_2-C_1$ applied to the liquid crystal light shutter, and responses R and U gained by these signals $S_1-C_1$ and $S_2-C_1$ in the case of the [0] signal present.

Figure 21A:
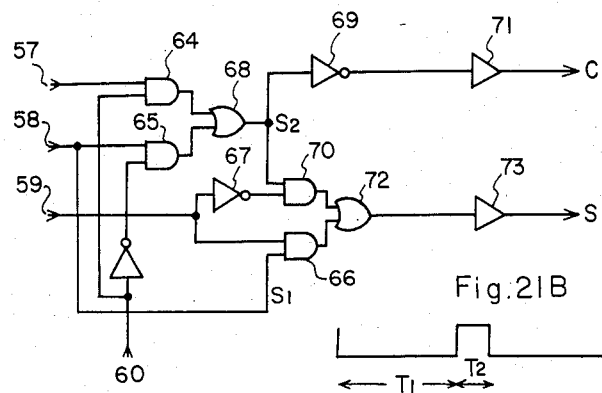
FIGS. 21A, 21B and FIGS. 22A, 22B are drive circuits employed to achieve the driving examples shown in FIGS. 19 and 20, respectively.
Figure 21B:
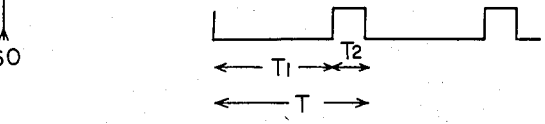
Figure 22A:
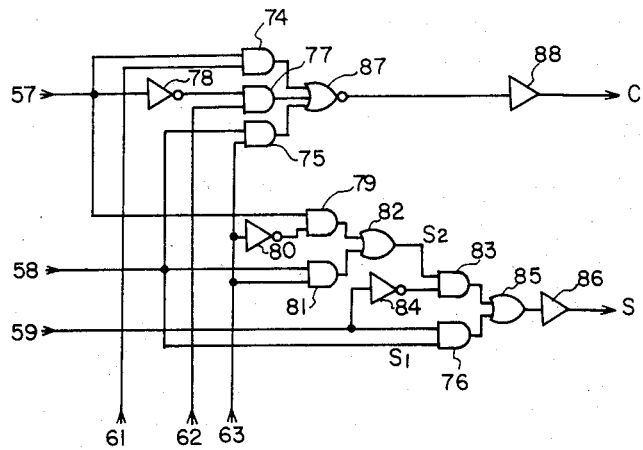
Figure 22B:
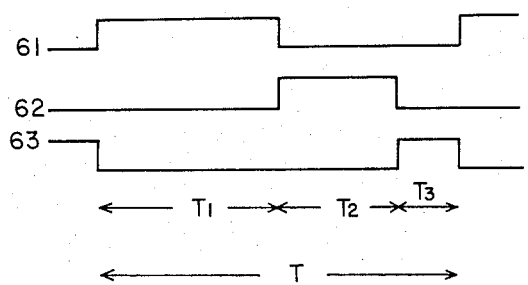

FIGS. 21 and 22 show examples of the driver circuits which correspond to FIGS. 19 and 20. Numeral 57 represents the $f_H$ signal, 58 the $f_L$ signal, and 59 recording data. Numeral 60 in FIG. 21A represents a timing signal shown in FIG. 21B and 61, 62 and 63 in FIG. 22A denote timing signals which correspond to those in FIG. 22B.

In the case of the circuit arrangement shown in FIG. 21, the $f_H$ signal 57 is inputted to a logical multiplication circuit 64 (which will be hereinafter referred to as AND circuit), the $f_L$ signal to AND circuits 65 and 66, and the recording data 59 to a logical inhibit circuit 67 (which will be hereinafter referred to as NOT circuit) and an AND circuit 66. Outputs of the AND circuits 64 and 65 are inputted to a logical sum circuit 68 (which will be hereinafter referred to as OR circuit), and output of the OR circuit 68 is inputted to NOT and AND circuits 69 and 70. Output of the NOT circuit 69 is outputted as a signal C through a buffer circuit 71.

Outputs of the AND circuits 70 and 66 are inputted to an OR circuit 72, output of which is outputted as a signal S through a buffer circuit 73. On the other hand, the timing signal 60 is inputted to the AND circuit 65 via the AND circuit 64 and NOT circuit.

In the case of the circuit arrangement shown in FIG. 22, the $f_H$ signal 57 and timing signal 61 are inputted to an AND circuit 74, the $f_L$ signal 58 and timing signal 63 to an AND circuit 75, the recording data 59 to an AND circuit 76, and the timing signal 62 to an AND circuit 77. The $f_H$ signal 57 is also inputted to the AND circuit 77 via a NOT circuit 78. On the other hand, the $f_H$ signal 57 and timing signal 63 are inputted to an AND circuit 79 through a NOT circuit 80, the $f_L$ signal 58 and timing signal 63 to an AND circuit 81, and outputs of the AND circuits 79 and 81 to an OR circuit 82. The outputs of the OR circuit 82 and a NOT circuit 84 are connected to the input of an AND circuit 83, and outputs of the AND circuits 83 and 76 are inputted to an OR circuit 85, output of which is outputted as the signal S through a buffer circuit 86. On the other hand, outputs of the AND circuits 74, 75 and 77 are inputted to a NOR circuit 87 which is an inhibit circuit of the OR circuit, and output of the NOR circuit 87 is outputted as the signal C through a buffer circuit 88.

The [0] signal in FIGS. 18 and 20 is intended to allow the just previous signal to achieve its accumulating response effect by a combination of signals when the time division drive is to be carried out. The [0] signal is also intended to reduce the current consumption of the liquid crystal when the high frequency $f_H$ signal is used.

Figure 23A:
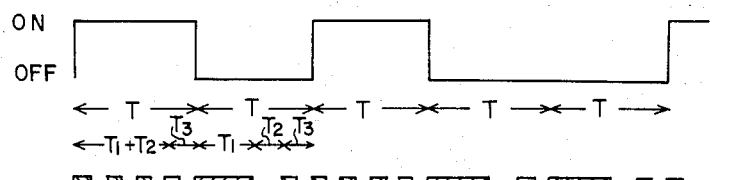
FIGS. 23A and 23B show a driving example according to the present invention.
Figure 23B:
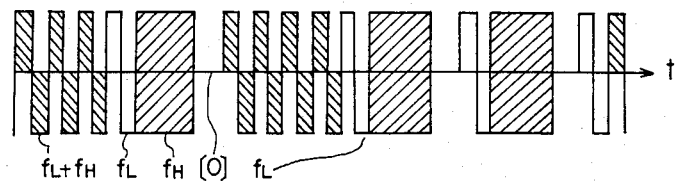

FIG. 23 shows that the drive shown in FIG. 20 is carried out, using the circuit in FIG. 22, to record data as shown in FIG. 23A. ON denotes a white dot under the on-state of the liquid crystal light shutter, while OFF a black dot under the off-state thereof. White-black-white-black-black-white are recorded in this example, and one writing cycle is represented by T.

Figure 23C:
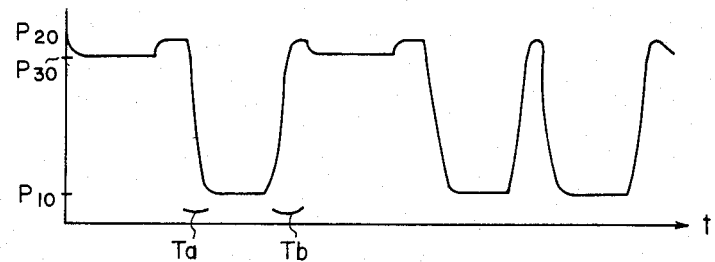
FIG. 23C is a waveform showing the response characteristic of the liquid crystal light shutter of GH type.

FIG. 23C shows response characteristic.

As described above, light is not completely shut off for that period during which black dot is to be recorded. Considering a period Ta—Tb, for example, quantitative leaking light which is denoted by $P_{10}$ is present and considerable amount of light is allowed to pass through the liquid crystal during the period Ta—Tb and irradiated onto the photosensitive body.

However, except those such as laser light having large absolute power, that is, in the case of light power which is in a range in which the so-called reciprocity law in the field of electrophotograph can be almost established, attenuation of static charge on the surface of the photosensitive body is determined by total amount of exposure, thereby enabling black dots to be formed.

In the case where many white dots are recorded but black dots are thinned in relation to the sub-scanning direction or moving direction of the photosensitive body, it can be solved by shortening or changing the shape of the micro-shutter 39 in FIG. 10 in relation to the sub-scanning direction. This shape or contour of the micro-shutter will be described later.

The liquid crystal light shutter used by the present invention is of normally-off and GH effect mode, which makes it unnecessary to cover the liquid crystal light shutter except its micro-shutter portion, thereby enabling it to be made simpler as compared with the liquid crystal light shutter of normally-on and TN type. In addition, liquid crystal agent in which dye is disolved to shut off light, as described above.

The operation of a recording control section 20 which controls information to be recorded to the liquid crystal shutter will be described.

Figure 24:
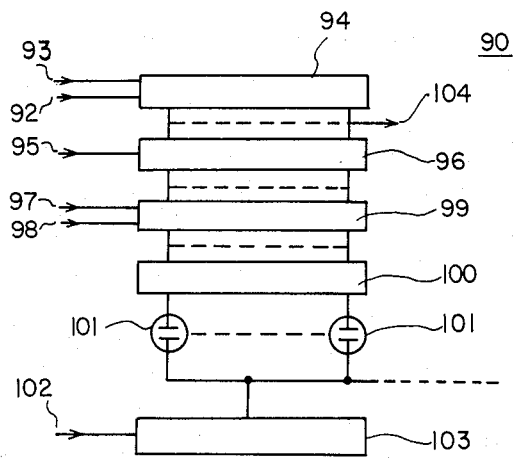
FIG. 24 is a block diagram showing the arrangement of an FP letter control section.
Figure 25A:
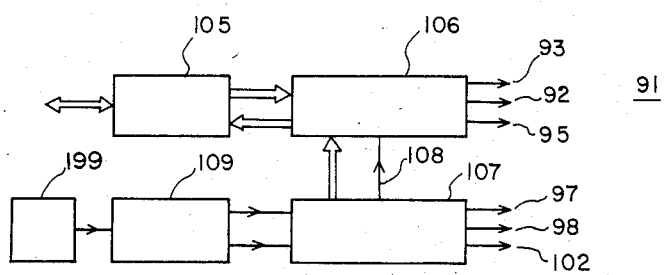
FIGS. 25A and 25B show a driver section for driving the liquid crystal light shutters according to the present invention, and their timing chart and waveforms.
Figure 25B:
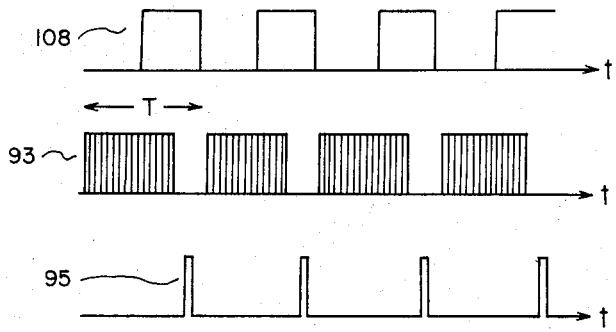

FIGS. 24 and FIG. 25A are block diagrams showing a liquid crystal light shutter driving section 90 and a printing control section 91, and FIG. 25B shows their timing chart.

The liquid crystal light shutter driving section 90 drives the liquid crystal light shutter, responsive to recording data 92 applied from the printing control section 91. The recording data 92 is picked up in serial manner by a shift register 94, synchronous with shift pulse 93. The shift register 94 is of such type that performs serial-in and parallel-out operations. When data which corresponds to one line is picked up by the shift register 94, latch pulse 95 is applied to a data latch 96, which reads the data of the shift register 94. The shift register 94 is thus made free and ready for receiving data which corresponds to next one line. The data read into the data latch selects either of on- and off-drive signals, using a data selector 99, and when the on-drive signal is received, logic level output of the data latch is fed to level shifter and high voltage driver 100, and this signal becomes segment drive signals for micro-shutters 101.

On the other hand, common electrode signal is converted to drive signal by means of a level shifter and high voltage driver 103 on the common electrode side of the micro-shutters, and this drive signal is outputted to the common electrode of the micro-shutters 101. Output 104 of the shift register 94 is allowed to become output signal to be applied to a subsequent shift register, thereby enabling multistage connection.

The printing control section 91 in FIG. 25 will be described. An interface section 105 feeds and receives various kinds of information such as command and status to and from external CPU, controller, and the like, and it also receives video signal from them to receive image information from outside. A video signal timing control section 106 receives a signal 108, which corresponds to one writing cycle T, from a liquid crystal light shutter drive signal generator section 107 to serially transfer and control the recording data 92 to the above-described liquid crystal light shutter driving section 90, synchronous with the writing cycle. Numerals 93 and 95 represent the above-mentioned shift clock and latch pulse, respectively, and FIG. 25B shows their timings. Output of an oscillator 199 is divided by a divider 109 and fed to the liquid crystal light shutter drive signal generator section 107, where the on-drive signal 97, off-drive signal 98 and common electrode signal 102 for driving the liquid crystal light shutter are generated and fed to the liquid crystal light shutter driver section 90.

The image recorded by the recording apparatus shown in FIG. 8 is recorded on a sheet of paper, as shown in FIG. 26. That area of a sheet of paper 110 on which information is practically recorded is represented by 111. As apparent from FIG. 26, it is seldom happened that recording covers all over the paper 110, but front, back, left and right blanks 112, 113, 114 and 115 are often left on the paper 110. Same blanks are also often left on the paper for various reasons in the case of the electronic copying machine, and erasing lamps which can perform whole or partial exposure between the charging and the developing section are provided as means for meeting this purpose. Since right and left blanks 114 and 115 become different, depending upon the kind of the recording paper 110, the erasing lamps must be divided to some groups and selectively turned on to erase charge on some necessary surface portions. An interval 116 between the two recording papers 110 is intended to prevent the subsequent recording paper from colliding with the previous one because of slip and skew of the previous recording paper, but practical recording speed becomes higher as the interval is made shorter.

As described above, it is preferable that those portions of the recording paper 110 which are not included in its recording portion 111, and the interval 116 allow light to irradiate the photosensitive body 17 for the period during which the charging section 18 in FIG. 8 is operated, so as to erase surface charge from the photosensitive body 17 and to prevent the unnecessary portion thereof from being developed at the developing section 21. It will be understood that this can be solved by opening the micro-shutters 36 of the liquid crystal light shutter 34 in the recording apparatus and using them as the erasing lamps. When the liquid crystal light shutter 34 is used, the eraser lamps are made unnecessary, as described above, and each of the above-mentioned blanks can be controlled with accuracy.

It is assumed that the size of recording papers which are treated by the recording apparatus is A3 and that recording density is 10 dots/mm. The micro-shuttes which correspond to about 3,000 dots/line are needed in this case. When the liquid crystal light shutter having a large recording capacity like this is statically driven, driver elements, number of wires and package area are increased to thereby make the cost high. In addition, recording density is increased, thereby making package engineering such as wiring and connecting more difficult. Therefore, these problems must be solved upon carrying out the time division drive.

Problems caused in the case of applying the time division drive to the liquid crystal light shutter will be described referring to FIG. 27, although they are overlapped by the conventionally-existed engineering problems.

Micro-shutters 117 arranged on a straight line are divided to n groups, write selecting electrodes are counted n units including C1–Cn, and recording signal electrodes are counted m units including S1–Sm. It is assumed that the moving direction of the photosensitive body or sub-scanning direction is shown by an arrow in FIG. 27C and that the time division drive is carried out as shown in FIG. 27B. Timing signals 121, 122,—123 are inputted to the write selecting electrodes C1, C2,—Cn, respectively. The micro-shutters 117 arranged on a straight line are driven according to the time division drive to become different in their recording times. Although recording is to be made as shown by a broken line 118 in FIG. 27C, they are delayed because of the time division drive, while the photosensitive body moves in the arrow direction. Therefore, recording is obliquely made, as shown by solid lines 119, on the photosensitive surface of the photosensitive body. Oblique angle 120 is determined, depending upon the moving distance of the photosensitive body which corresponds to the writing cycle Tw at the time of time division.

In the case of using the liquid crystal light shutter as the recording means as described above, it is not satisfactory from the viewpoint of exposure reduction and recording quality that the time division drive is carried out according to the same manner as in the case of the display means.

An n-time division drive of the present invention will be described.

For the sake of clarity, the time division drive will be described about the case of n=2 or n=3.

Figure 28:
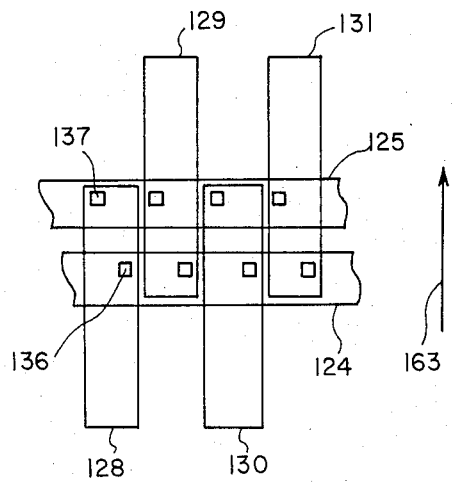
FIG. 28 shows the arrangement of micro-shutters in the case of the 2-time division drive.

An arrangement of the liquid crystal light shutter which is driven by the 2-time division drive is shown in FIG. 28. Micro-shutters 136 and 137 made of transparent electrodes are formed at those areas of two write selecting electrodes 124 and 125 which are crossed by recording signal electrodes 128–131, which are arranged, alternately projecting from one of the write selecting electrodes in reverse directions for the purpose of making the aperture efficiency of shutter large and their subsequent wiring easy. Numeral 163 denotes the moving direction of the photosensitive body or sub-scanning direction.

Figure 29:
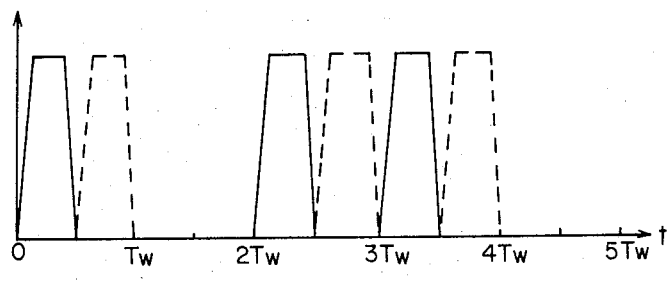
FIG. 29 is a characteristic view showing the light response in the case of the conventional 2-time division drive.

According to the conventional 2-time division drive and if an example wherein white-black-white-white-black are recorded at the micro-shutters 136, 137,—on the write selecting electrodes 124 and 125 is cited, recording signal whose light response is as shown in FIG. 29 is applied to the recording signal electrodes 128–131. Tw represents a writing cycle in this case.

As apparent from FIG. 29, recording operation is made only for a selection period Tw/n in the case of the conventional n-time division drive. Therefore, shutter closing is certainly made for the period Tw/n, and it is left so for a non-selection period (1−1/n)Tw.

The time division drive of the present invention is characterized in that the write selecting signal does not cause the shutter to be closed for the selection period Tw/n and that the recording state provided in the shutter by the recording signal at the just previous selection time is held for the non-selection period (1−1/n)Tw.

Figure 30:
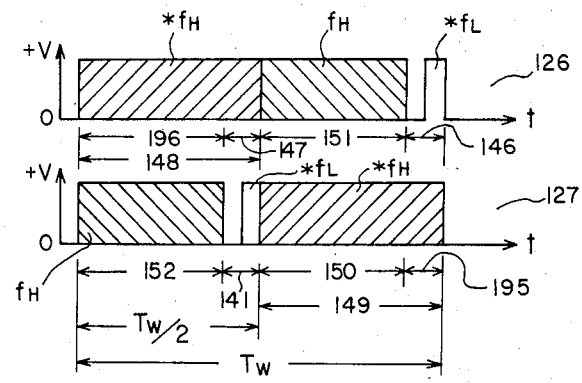
FIG. 30 is a waveform diagram showing a write selecting signal and intended to explain a 2-time division drive according to the present invention.

In FIG. 28, write selecting signals 126 and 127 shown in FIG. 30 are applied to the write selecting electrodes 124 and 125, and the selection period is assigned to either of first and second halves of Tw. The recording signal which is applied to the recording signal electrodes 128–131 is any of signals 132–135 shown in FIG. 31. The recording signal 132 turns on a micro-shutter 136 at the selection time of the write selecting electrode 124 and a micro-shutter 137 at the selection time of the write selecting electrode 125. The recording signal 132 is therefore of on-on type. Similarly, the recording signal 133 is of on-off type, 134 of off-on type, and 135 of off-off type. The driver signal which is applied to the micro-shutter 136 on the write selecting electrode 124 is one of on-on driver signal 138 caused by 132 and 126, on-off driver signal 139 caused by 133 and 126, off-on driver signal 140 caused by 134 and 126, and off-off driver signal 198 caused by 135 and 126. The driver signal which is applied to the micro-shutter 137 is one of those which are gained by delaying the driver signals shown in FIG. 32 by Tw/2 in phase.

Figure 32:
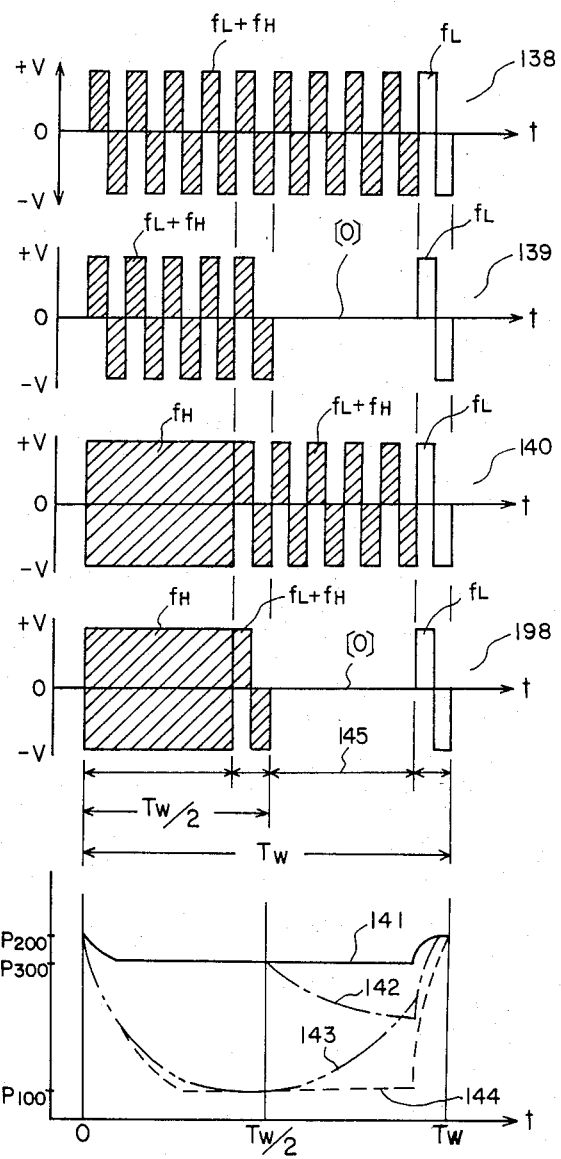
FIG. 32 is a waveform diagram showing a drive signal and its light response characteristic.
Figure 33A:
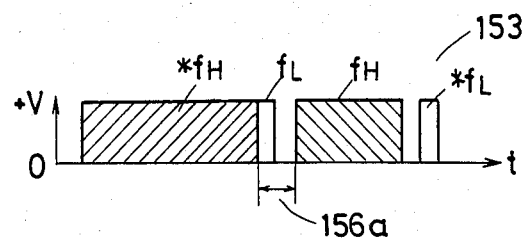
Figure 33B:
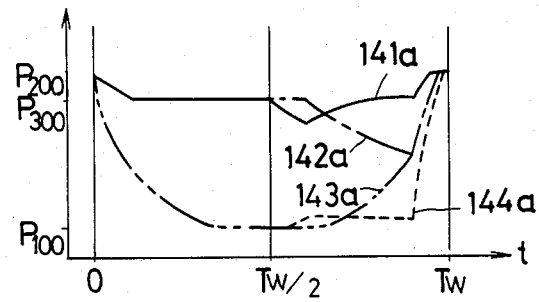

Light response characteristics gained when one of these driver signals 138–140 and 198 is applied to the micro-shutter 136 are represented by numerals 141–144 in FIG. 32. These characteristics correspond to the on-on driver signal 138 - off-off driver signal 198, respectively. The response 142 which tends to be closed by the on-signal and the one 143 which tends to be opened by the off-signal depend upon which of the silent signal [0] and superposed signal $f_L+f_H$ is applied for a non selection period.

If the on-response 142 and off-response 143 can be made same in level as those 141 and 144, respectively, when the micro-shutter 136 is taken into consideration, the drive can be performed in such a way that the recording state gained at the time of the just previous selection is held till the time of subsequent selection even for the non-selection period. Therefore, the drive can be done as apparent static one in spite of the time division drive, thereby allowing exposure time to be made longer than 1/n and the photosensitive surface of the photosensitive body to be exposed sufficiently. This effect is remarkable.

Figure 31:
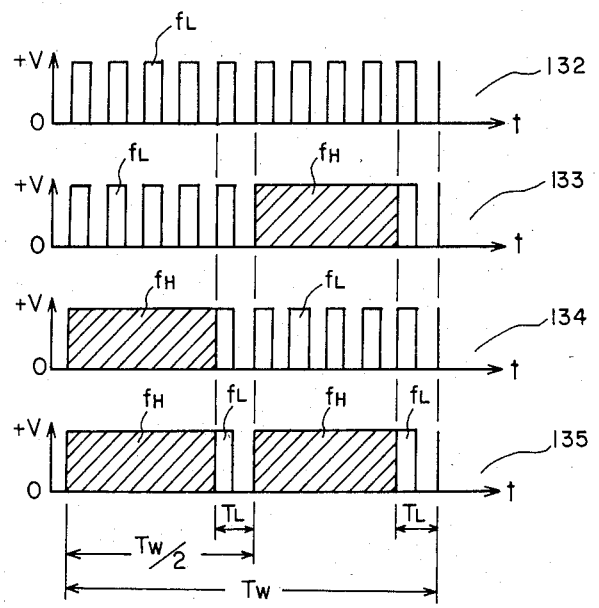
FIG. 31 is a waveform diagram showing a recording signal.

In the case of the recording signals 132–135 shown in FIG. 31, a period $T_L$ during which the $f_L$ signal is applied is provided at each of first and second halves of Tw/2, respectively. As shown in FIG. 30, the period $T_L$ at the second half corresponds to a period $T_L$146 of the write selecting signal 126, while the period $T_L$ at the first half to a period $T_L$241 of the write selecting signal 127, and they are intended to allow the drive to be performed in such a way that the $f_L$ signal is applied at the last of every writing cycle Tw to open the liquid crystal light shutter. As already described above, this is to cut the hysteresis caused by high frequency.

The write selecting signals 126 and 127 shown in FIG. 30 have selection periods 148 and 149, respectively, which are denoted by the *$f_H$ signal. More specifically, periods 196 and 150 from which periods 147 and 195 are removed, respectively, are practical selection periods, said periods 147 and 195 corresponding to the period $T_L$, respectively.

The driver signal for the non-selection period 145 in the example of the 2-time division drive shown in FIG. 32 is composed of the $f_H$ signal in a non-selection period 151 of the write selecting signal 126 shown in FIG. 30, and of the recording signals 132–135 shown in FIG. 31. It is impossible in the case of the recording signals 132–135 that the signal at the second half Tw/2 is made different from the one at the first half, but the write selecting signals 126 and 127 can be changed to some extent in the non-selection period.

As already described with reference to FIGS. 14 through 16, the liquid crystal light shutter is not closed by the [0] signal applied just after it is opened, and it is also not opened by the $f_L+f_H$ signal applied just after it is closed by the $f_H$ signal. In order to further study this phenomenon, the signals in non-selection periods 151 and 152 shown in FIG. 30 were changed, as shown in FIGS. 33 through 36. The write selecting signal 127 in FIG. 30 is different by 180 degrees only in phase from the signal 126 but same in effect as the latter. Therefore, the following will be about the write selecting signal 126.

A part of the $f_H$ signal portion 151 in the non-selection period of the write selecting signal 126 shown in FIG. 30 is replaced by the $f_L$ signal, and its states are shown by waveforms 153–156 in FIGS. 33 through 36, while the $f_L$ signal portion is denoted by 156a, 156b, 156ac and 156bc, respectively.

Light response characteristics gained when these write selecting signals 153–156 are applied are shown in FIGS. 33B–36B, respectively.

Photo-transmittances $P_{100}$, $P_{200}$ and $P_{300}$ represent the light responses gained when each of the $f_H$, $f_L$ and $f_L+f_H$ signals is successively applied.

Light responses 141a, 141b, 141ac and 141bc are gained when the on-on recording signal 132 in FIG. 31 is applied, light responses 142a, 142b, 142ac and 142bc by the on-off recording signal 133, light responses 143a, 143b, 143ac and 143bc by the off-on recording signal 134, and 144a, 144b, 144ac and 144bc by the off-off recording signal 135. When they are compared with those 141–144 in FIG. 32 about the performance of light response characteristics in a selection period 0−Tw/2 and a non-selection period Tw/2−Tw, the following will be derived.

Figure 36A:
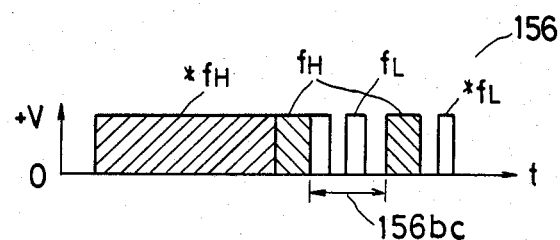
Figure 36B:
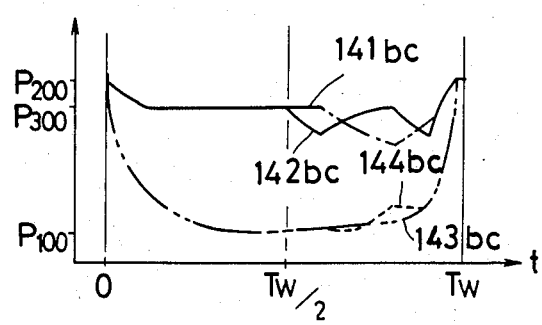

When the write selecting signal 126 in FIG. 30 is used as the signal which is applied to the liquid crystal light shutter for the nonselection period Tw/2−Tw and in relation to the recording signals 132–135, two kinds of signals are present, as shown by 138–141 in FIG. 32, and the example shown in FIG. 36 which is an example in the case where other write selecting signals 153–156 shown in FIGS. 33A–36A are used is shown as waveforms 157–160 in FIG. 37. Two kinds of driver signals 161 and 162 are also present for the non-selection period Tw/2—Tw. Namely, $2^{n-1}$ kinds of combinations are provided in the n-time division drive.

Figure 34A:
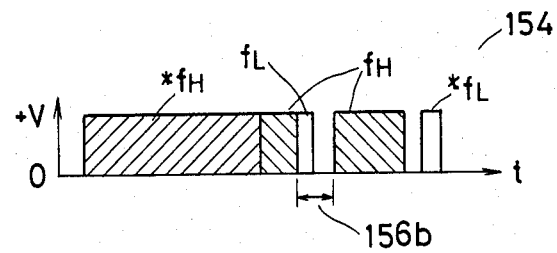
Figure 34B:
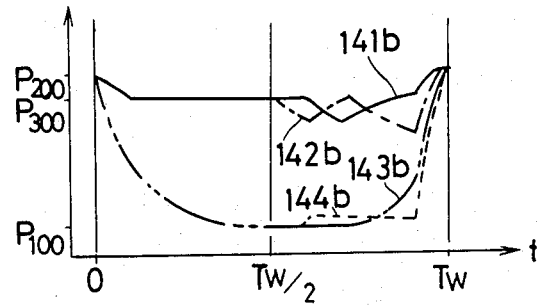
Figure 35A:
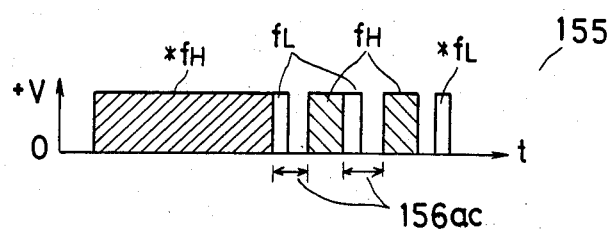
Figure 35B:
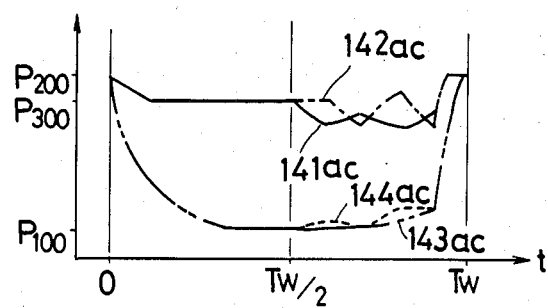

When the write selecting signal in FIG. 30 is used as described above, one 142 of the on-responses tends to be closed and one 143 of the off-responses tends to be opened. When a part of of each of the $f_H$ signal portions 151 and 152 in the non-selection period of the write selecting signals 126 and 127 in FIG. 30 is converted to the $f_L$ signal to improve each of the responses, light responses shown in FIGS. 33-36 are gained and the on-responses 141b and 142b or 141bc and 142bc, and the off-responses 143b and 144b or 143bc and 144bc show almost similar behaviour, as shown in FIGS. 34 and 36.

In the case where light strength is in a range in which the so-called reciprocity law in the field of electrophotograph is almost established, attenuation of the static charge on the surface of the photosensitive body is determined by total amount of exposure, as already described above. Therefore, on- or off-responses are made same in level, so that white or black dots can be recorded similarly.

According to the n-time sharing drive of the present invention, the driver signals which are applied for non-selection period have $2^{n-1}$ kinds of combinations and the accumulation effect of liquid crystal can be effectively used in non-selection period whatever drive may be carried out in selection period. Therefore, the state in the selection period Tw/n can be held even during the non-selection period (1−1/n)Tw, and the drive seems to be of apparent static type. In addition, exposure time does not become 1/n. Therefore, the effect thus achieved is remarkable. The drive in FIGS. 30-36 was carried out under the condition of $f_H$=300 KHz, $f_L$=5 KHz, 30 V, Tw=2 ms, and liquid crystal temperature 45° C.

Light responses gained when the drive is conducted to record white-black-white-white-black dots on the micro-shutters 136 and white-black-black-white-black dots on the micro-shutters 137, using the arrangement of 2-time division drive shown in FIG. 28 and providing that the writing cycle is Tw, are shown as waveforms 163 and 164 in FIG. 38.

When compared with the light responses shown in FIG. 29 and gained according to the conventional 2-time sharing drive, it can be understood that the drive of the present invention is closely similar to the apparent static one because the shutters are not necessarily closed after the selection period Tw/2 (or usually Tw/n) and the assigned writing cycle Tw is effectively used.

Distance l between the micro-shutters 136 and 137 in a sub-scanning direction in FIG. 28 will be determined as described below.

The write selecting signal which is applied to the micro-shutters 137 for the writing cycle Tw is delayed by Tw/2 from the one applied to the micro-shutters 136. Therefore, the photosensitive body moves by Tw/2 toward the subscanning direction 163 during Tw/2. In order to achieve linear recording as shown by 118 in FIG. 27C, it can be easily understood that l is needed to equal to $(k+\frac{1}{2})D$, providing that recording density relative to the micro-shutters 137 is D in the sub-scanning direction 163, wherein k is an integer like 0, 1, 2, —. Since $D=V \cdot Tw$, providing that sub-scanning speed is V, $l=(k+\frac{1}{2})V \cdot Tw$.

When k=0, the recording data which is applied to the micro-shutters 137 is on same line as the one which is applied to the micro-shutters 136, but when k≠0, the former must be delayed by k line from the latter, thereby making it necessary to use the delay circuit, line buffer and the like for the data.

The distance l between the micro-shutters which are arranged in zigzag in the case of the n-time sharing drive can be usually expressed as follows:

$$l=(k+1/n)D=(k+1/n)V \cdot Tw$$

Therefore, when micro-shutters 188-190 are arranged in zigzag even in the case of 3-time sharing drive, as shown in FIG. 41, and the recording data is applied as described above, the linear recording can be achieved as shown by 118 in FIG. 27C.

The liquid crystal light shutter driving circuit in the case of the time sharing drive as described above will be described below.

As already described above, the distance l between the micro-shutters 136 and 137 in the sub-scanning direction 163 in FIG. 28 must be made equal to $(k+1/n)D$ (n=2 in this case) and the recording data which is applied to the micro-shutters 137 must be delayed by k line or k Tw from the one which is applied to the micro-shutters 136. Taking this matter into consideration, an arrangement of the liquid crystal light shutter driving circuit will be described, citing the 2-time sharing drive as an example and referring to FIG. 39.

Figure 39:
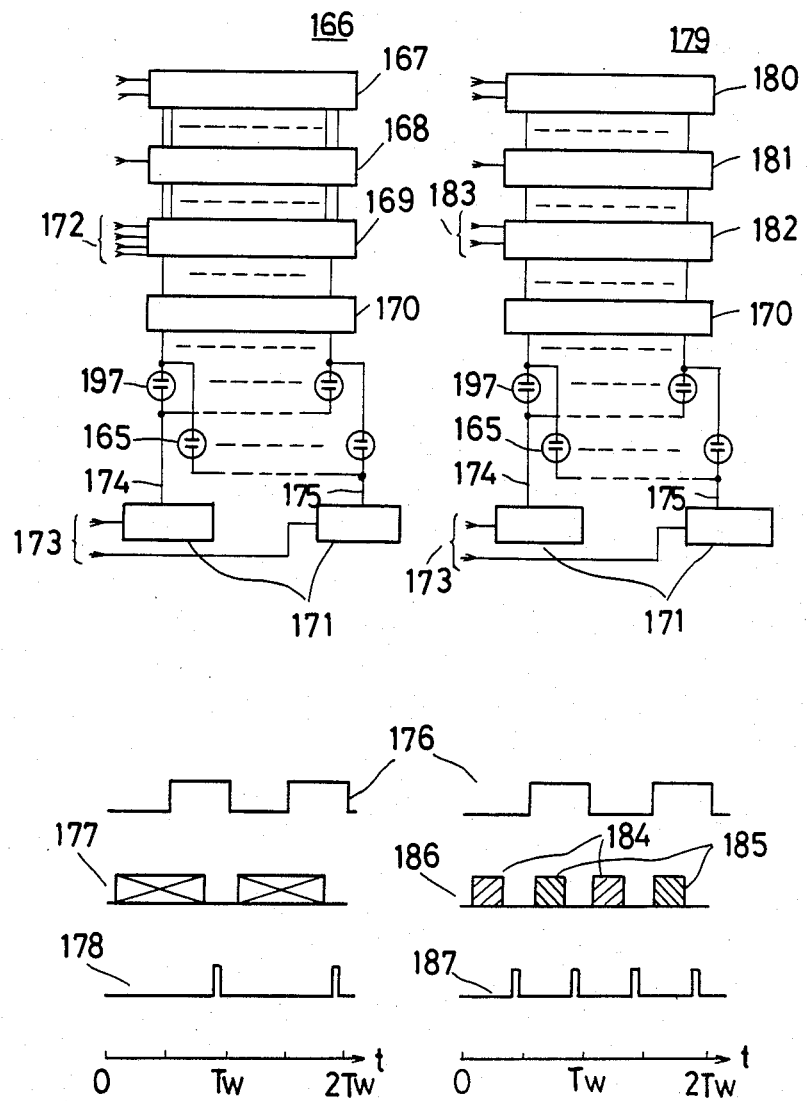
FIG. 39 is a block diagram showing a drive for the liquid crystal light shutters employed by the present invention.

The driver circuit shown in FIG. 39 is arranged according to two manners, depending upon how the recording data is applied. It is assumed that the total number of liquid crystal light shutters 197 and 165 is m units and m represents an even number. The micro-shutters 197 and 165 correspond to those 136 and 137 in FIG. 28.

A liquid crystal light shutter driving circuit 166 comprises an m-bit shift register 167, m-bit data latch 168, m-bit data selector 169, and level shifter and high voltage driver 170, 171 and receives alternately m-bit recording data relative to the micro-shutters 197 and m-bit k-line-delayed recording data relative to the micro-shutters 165 within the writing cycle Tw. One of recording signals 172 is selected by the data selector 169, responsive to the mixed recording data shifted to the data latch 168 and fed to the level shifter and high voltage driver 170. The recording signals 172 correspond to those 132-135 in FIG. 31. Write selecting signals 173 are converted to write selection driving signals 174 and 175 through the level shifter and high voltage driver 171, and these write selection driving signals 174 and 175 correspond to those which are formed by delaying the phase of the signals 154, in FIG. 34A by Tw/2, for example, and serve to drive the write selecting electrodes 124 and 125 in FIG. 28, respectively. Synchronizing with a writing cycle signal 176, the a mixed recording data 177 is received by the m-bit shift register 167 and shifted to the data latch 168, responsive to a latch pulse 178.

Numeral 179 represents another example of the liquid crystal light shutter driving circuit which comprises an m/2-bit shift register 180, m/2-bit data latch 181, m/2-bit data selector 182, and level shifter and high voltage driver 170, 171. The recording data relative to the micro-shutters 197 and the k-line-delayed recording data relative to the micro-shutters 165 are separated at first and second halves of the writing cycle Tw and received. One of recording signals 183 is selected by the data selector 182, responsive to the separated recording data shifted to the data latch 181, and fed to the level shifter and high voltage driver 170. The recording signals 183 correspond to those 132 and 135 in FIG. 31. As shown in FIG. 39, a recording data 186 which is divided to waveforms 184 and 185, synchronous with a write synchronizing signal 176, is received by the shift register 180 and shifted to the data latch 181, responsive to a latch pulse 187. The recording data 184 is for the micro-shutters 197, while the k-line-delayed recording data is for the micro-shutters 165, which is separated by the interval l from the micro-shutters 197.

As shown by the above-mentioned two examples, $2^{n-1}$ kinds of driver signals are provided at the time of non-selection, whichever drive may be employed.

The above is related to the examples of the 2-time division drive according to the present invention. The time division drive of the present invention will be described, citing an example of 3-time division drive.

FIG. 40 shows light response characteristics gained at the time of the 3-time sharing drive. The light responses gained when the drive is carried out to record white-black-white-white-black-black dots on micro-shutters 188, 189 and 190 in FIG. 41 are shown as waveforms 191, 192 and 193, respectively, in FIG. 40. Selection periods which are assigned to write selecting electrodes 194, 195 and 196 are represented by 191a 192a and 193a, each of which is Tw/3.

Regardless of employing the driver circuit 166 or 179 in FIG. 39, the drive by which the accumulation effect of liquid crystal is appropriately achieved is conducted to keep the driving state, which is gained in the selection period Tw/3, even during the non-selection period $(1-\Delta)Tw$ from which the selection periods 191a, 92a and 193a in relation to the waveforms 191, 192 and 193 are excluded. As the result, the drive appears like the apparent static one, thereby enabling remarkable reduction of exposure time to be prevented.

Figure 42:
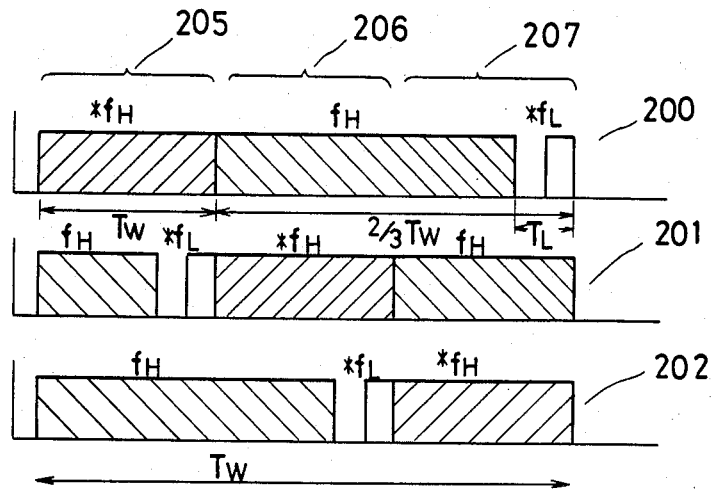
FIG. 42 is a waveform diagram showing the write selecting signal in the case of the 3-time division drive.

FIG. 42 shows write selecting signals which are applied to write selecting electrodes 194–196 this time. In the case of a write selecting signal 200 which is applied to the write selecting electrode 196, the first period Tw/3 of one writing cycle Tw is a selection period for the *$f_H$ signal. $f_H$ is applied for a non-selection period 170 Tw−$T_L$ and *$f_L$ for the last period $T_L$. A write selecting signal 201 which is shifted by Tw/3 in phase from the write selecting signal 200 is applied to the write selecting electrode 195 and a write selecting signal 202 which is shifted by $\frac{2}{3}$Tw in phase from the write selecting signal 200 is applied to the write selecting electrode 194.

Figure 43:
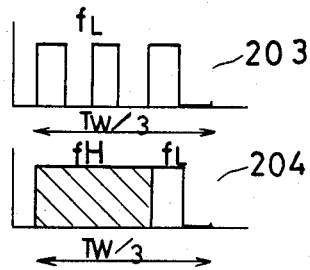
FIG. 43 is a waveform diagram showing the recording signal in the case of the 3-time division drive.

Recording signals shown in FIG. 43 are applied to the recording signal electrode, and either of opening and closing signals 203 and 204 is applied every period Tw/3 according to images to be recorded. When all of the micro-shutters in FIG. 41 are to be closed, for example, the closing signal 204 may be applied to the recording signal electrode, which includes the micro-shutters 188–190, successively three times during the period Tw. When the micro-shutters 188 and 190 are to be opened while closing the micro-shutters 189, the opening signal 203, closing signal 204 and opening signal 203 may be applied in this order to the recording signal electrode, which includes the micro-shutters 188–190, corresponding to the first period Tw/3, subsequent period Tw/3, and last period Tw/3.

Figure 44:
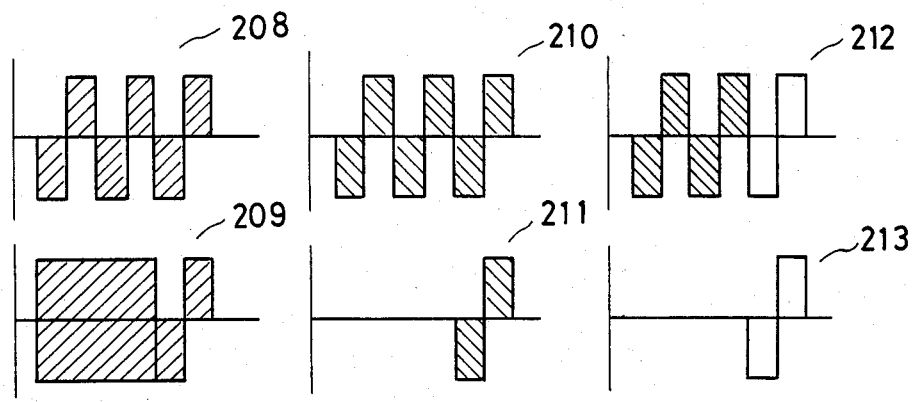
FIG. 44 is a waveform diagram showing a composite signal in the case of the 3-time division drive.

Signals which are composed of those applied to the recording signal and write selecting electrodes 194–196 like this take six kinds of waveforms as shown in FIG. 44. This means that the waveforms which are obtained by three-dividing the writing cycle Tw of the write selecting signal 200, representing the times Tw/3 by 205–207, and time-composing the recording signals 203 and 204 with each time Tw/3 are six kinds, because the write selecting signals 200–202 are shifted every time Tw/3 in phase from one another. Namely, a signal which is composed of the write selecting signal of the time 205 and the recording signal 203 is represented by 208, and a signal which is composed of the write selecting signal of the time 205 and the recording signal 204 is denoted by 209. Similarly, a composite signal between the write selecting signal of the time 206 and the recording signal 203, and a composite signal between the write selecting signal of the time 206 and the recording signal 204 are denoted by 210 and 211, respectively, while a composite signal between the write selecting signal of the time 207 and the recording signal 203 and a composite signal between the write selecting signal of the time 207 and the recording signal 204 are represented by 212 and 213, respectively.

Figure 45:
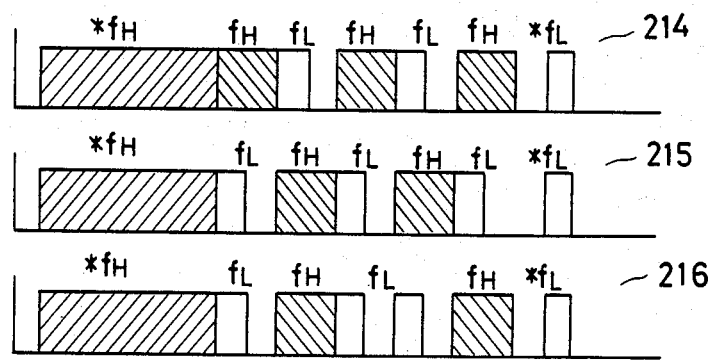
FIG. 45 is a block diagram showing the write selecting signal in the case of the 3-time division drive.

If it is done like this, the $f_L$ opening signal never fails to be applied to the composite signal 208 just before the selection period, so that the opening composite signal 209 for the selection period can be used as closing signal for the selection period. The composite signals 210 and 211 are for the non-selection period and can be used as signals for keeping the closed or opened state in the selection period. The composite signals 212 and 213 can be used as signals for keeping the closed or opened state in the nonselecting period and also as signals for finally applying the $f_L$ or opening signal to make the micro-shutters opened and ready for a next one cycle writing. It has been described upon explaining the 2-time division drive that good response can be gained by alternately applying the signals $f_H$ and $f_L$ as shown in FIGS. 33 through 36 instead of the write selecting signal $f_H$ shown in FIG. 30. The same can be said about the 3-time sharing drive and good response can be gained by applying the *$f_L$ signal during the non-selection period, as shown as signals 214–216 in FIG. 45, instead of the write selecting signal 200 and alternately applying the $f_L$ and $f_H$ signals during a non-selection period except the above-mentioned non-selection period. When the drive of the present invention is employed, the micro-shutters can be statically driven, using 4-, 6- or more time division drive ih addition to the 3-time division drive.

In the case of the liquid crystal light shutter driving circuits 166 and 179 shown in FIG. 39, the recording data is received in serial, but it is supposed that the recording data is received in parallel (or in 8-bit parallel, for example) and this parallel reception can more shorten the transferring time of the recording data.

An example of practical printing by means of the above-described recording apparatus will be described below.

A double-frequency-driven liquid crystal ZLI - 2461 made by. Merque Corporation was employed and a liquid crystal mixture to which 1.5 weight % of a dichromatic dye of the Disazo group was added was sealed, as shown in FIG. 11, keeping the thickness of the liquid crystal 4–5 $\mu$m. Micro-shutters of 90 $\mu m°$ were arranged in a density of 10 units/mm, as shown in FIG. 28, and the interval l between the micro-shutters arranged in zigzag was made 250 $\mu$m. An aluminate fluorescent lamp of 18W was used as the light source, and a Selfoc lens ($\theta=20°$) made by Japan Plate Glass Corporation was used as the focussing lens. An organic photoreceptor of the function division type was used and moved at 50 mm/sec. Keeping the liquid crystal light shutter 40–45° C. and providing that $T_1=0.8$ ms, $T_2=0.2$ ms, $f_L=5$ KHz, $f_H=300$ KHz and 30 V in the 2-time division drive shown in FIG. 37, optical writing was conducted in a writing cycle Tw=2 ms and normal developing was then applied to it. An image having a recording density of 10 dots/mm at 100 μm° was obtained.

According to the time division drive of the present invention as described above, the liquid crystal light shutter can be opened and closed without remarkably reducing the exposure time, thereby producing a big value in the industrial field.

Although it has been described that the liquid crystal light shutter is operated by the time sharing drive, the viscosity of the liquid crystal agent sealed in the liquid crystal light shutter also changes depending upon temperature. There will be described a recording apparatus capable of effectively irradiating light onto the photoreceptor without leaking any light through the micro-shutters even when the temperature of the liqhid crtstal light shutter changes.

Figure 46A:
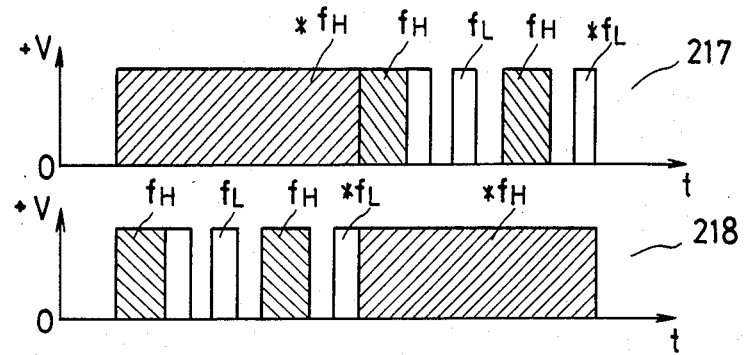
FIGS. 46A and 46B are waveform diagrams showing signals applied to write selecting electrodes and recording signal electrodes.
Figure 46B:
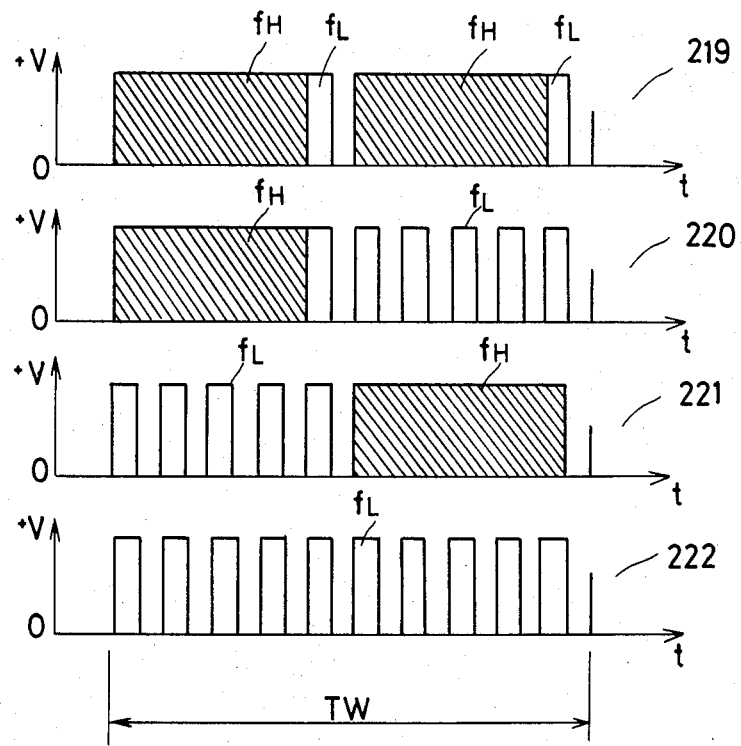
Figure 47:
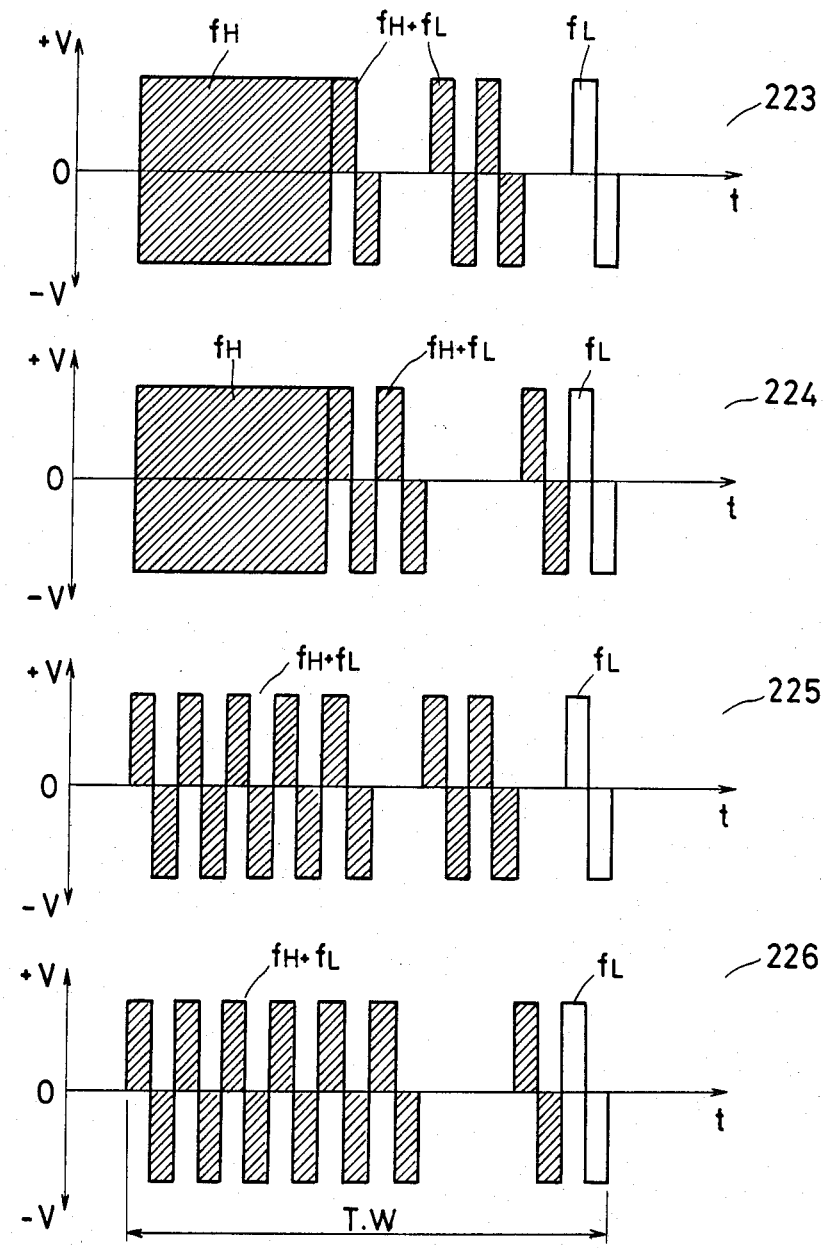
FIG. 47 shows driving waveforms composed of the waveforms in FIG. 46 and practically applied to the liquid crystal.

When write selecting signals 217 and 218 shown in FIG. 46A are applied to the write selecting electrodes and recording signals 219–222 shown in FIG. 46B are applied to the recording signal electrode, for example, they becomes composite signals 223–226 shown in FIG. 47, taking the period Tw as one cycle. As described above, the signals 223 and 224 have waveforms for closing the micro-shutters, while the signals 225 and 226 waveforms for opening the micro-shutters.

Figure 48:
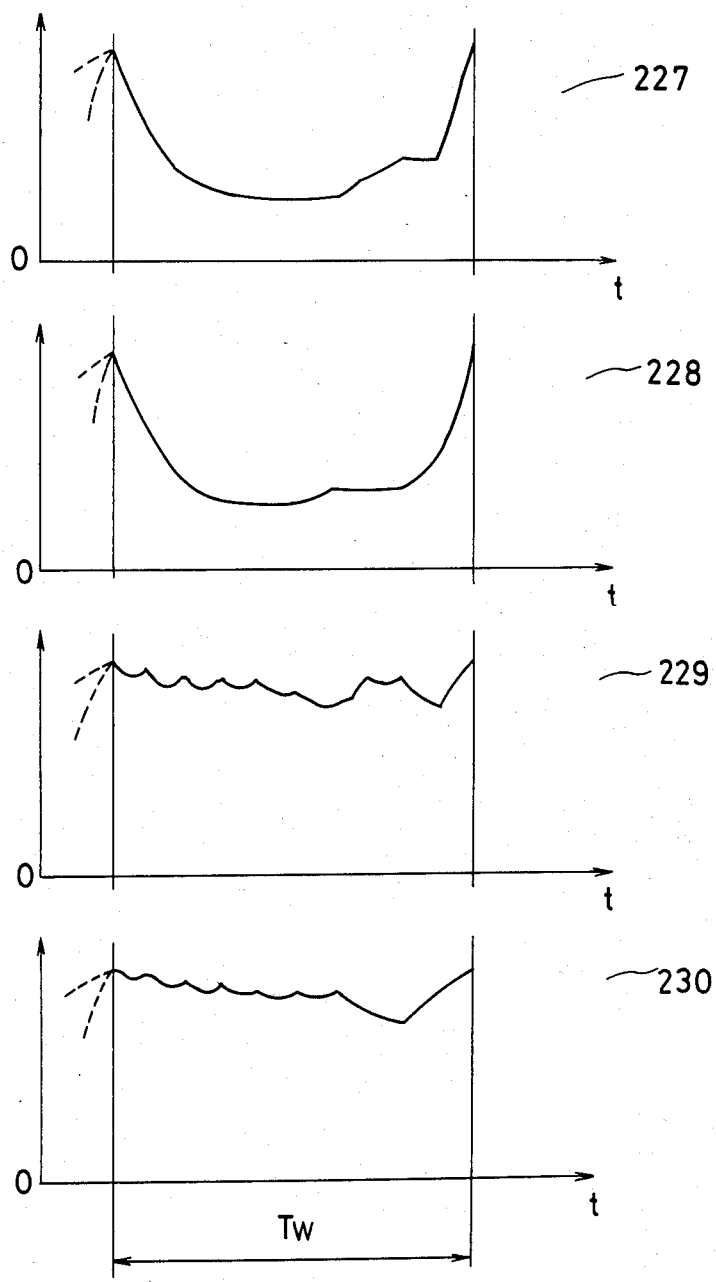
FIG. 48 is a characteristic view showing the phototransmittances of shutters responsive to the driving waveforms.

FIG. 48 shows the micro-shutters opened and closed, responsive to the signals 223–226, and as apparent from waveforms 227–230 in FIG. 48, the micro-shutters are necessarily opened at the first and last of one cycle Tw.

FIG. 49 shows an example of the liquid crystal light shutter which was operated according to this driving manner under the condition of $f_H=150$ KHz, $f_L=2$ KHz and 46° C. FIG. 49A shows a behaviour characteristic obtained when it is repeated that the closing signal (or waveform 223 in FIG. 47) is applied during 63Tw starting from T1 and ending in T63 and that the opening signal is applied at T64. On the contrary, FIG. 49B shows a behaviour characteristic obtained when it is repeated that the opening signal is applied during 63Tw starting from T1 and ending in T63 and that the closing signal is applied at T64.

Figure 49A:
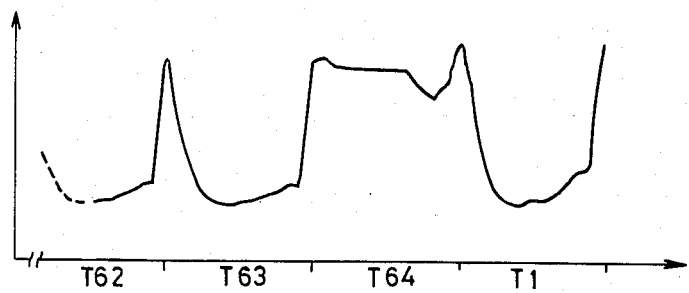
FIGS. 49A-D, 50A-D and 51A-D show performances of the micro-shutter caused at 46° C., 43° C. and 53° C., respectively.
Figure 49B:
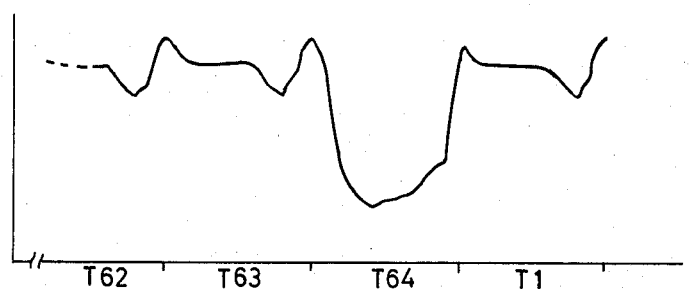
Figure 49C:
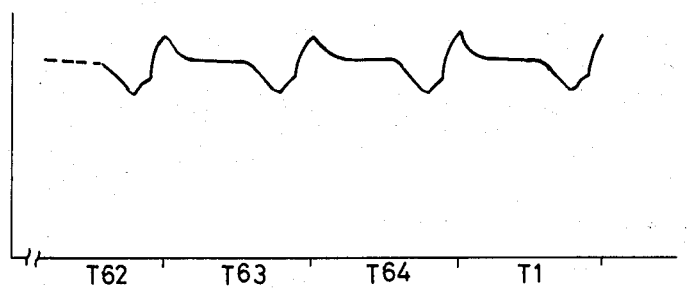
Figure 49D:
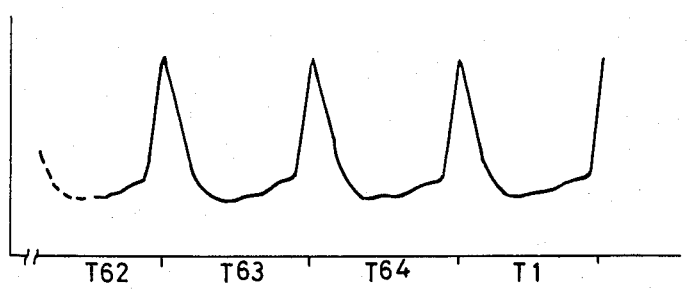
Figure 50A:
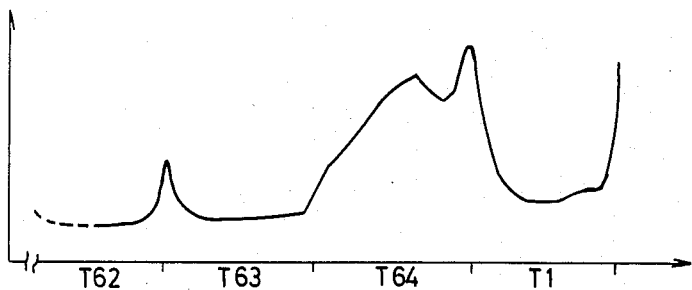
Figure 50B:
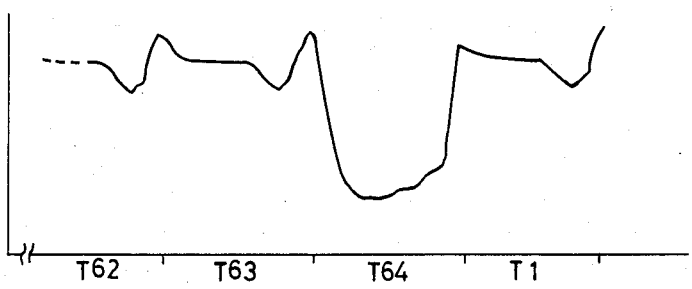
Figure 50C:
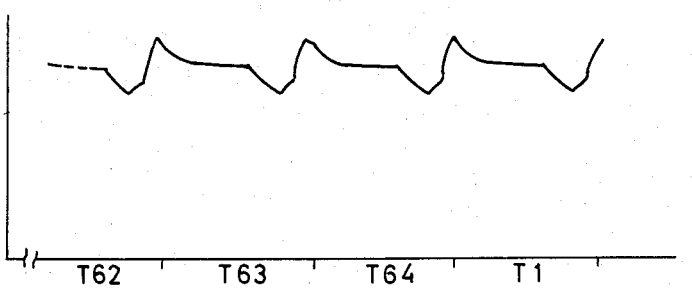
Figure 50D:
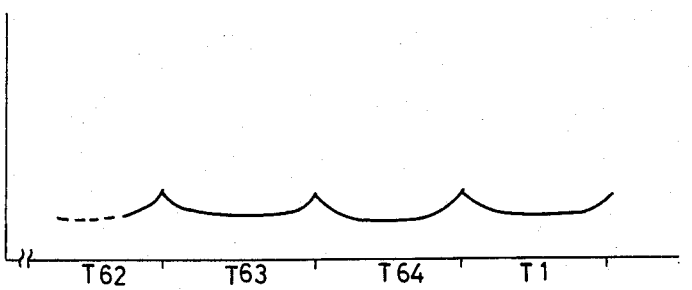
Figure 51A:
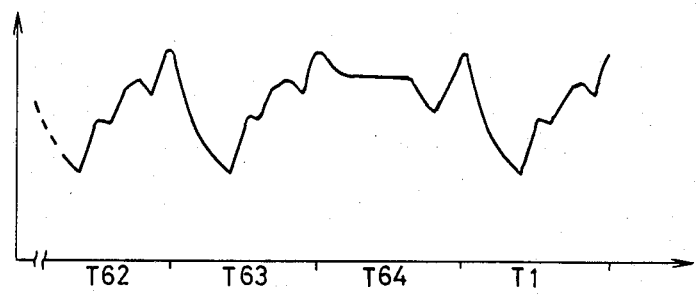
Figure 51B:
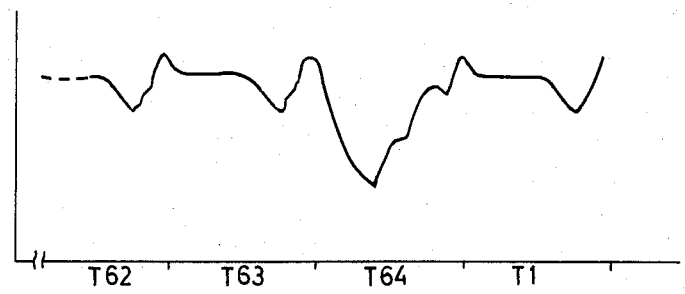
Figure 51C:
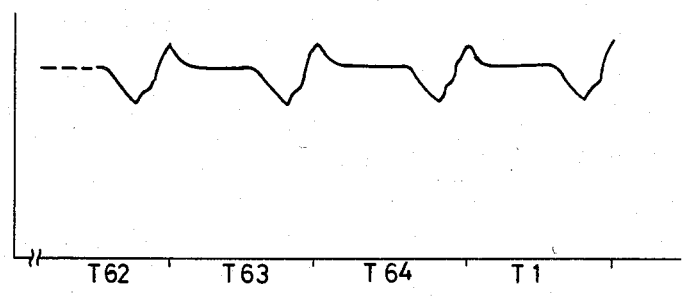
Figure 51D:
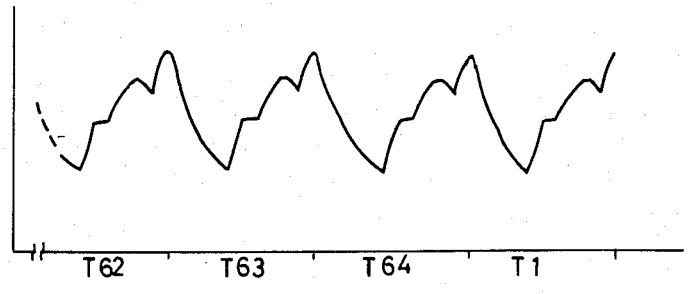

FIG. 49C shows a behaviour characteristic obtained when the opening signal is successively applied and FIG. 49D a behaviour characteristic obtained when the closing signal is successively applied. The characteristic during T64 in FIG. 49A is same as that in FIG. 49C and the characteristic during T64 in FIG. 49B is substantially similar to that in FIG. 49D. This means that the micro-shutters are certainly operated during Tw without being influenced by hysteresis effect. In other words, this shows that a state under which white and black dots can be printed completely is established.

FIG. 50 shows another case where the same micro-shutters are driven by the same driver signals but the temperature of the liquid crystal is 43° C. which is about 3° C. lower than that in FIG. 49. When FIG. 50D is viewed, the operation of opening the shutters responsive to the $f_L$ signal every end of Tw is not attained completely. This is because the viscosity of the liquid crystal becomes high due to low temperature to thereby make the operation of the micro-shutters slow. In the case of FIG. 50A, the micro-shutters are not opened completely at the first of T64. When temperature becomes lower, the micro-shutters are not opened at all at T64. In other words, white dots cannot be printed after successive black dots.

FIG. 50 shows characteristics obtained when the temperature of the liquid crystal is raised to 53° C. No problem is caused in the operation of opening the shutters, but in the operation of closing the shutters, the shutters tend to be closed at the first half of Tw but they are opened at the second half of Tw because they cannot keep their closing operation. This is because the viscosity of the liquid crystal becomes low due to the raised temperature, $f_c$ is thus made high, influence of $f_H+f_L$ in the waveform 223 in FIG. 47 becomes strong, and the force of closing the shutters is made unbalanced due to no voltage present.

If the above-described state is caused, light leaked when the shutters are closed is increased to lower the contrast of white and black.

As described above, the micro-shutters change their characteristic delicately according to temperature. Therefore, accurate temperature control is needed.

A second example of the recording apparatus according to the present invention which can prevent any influence of this temperature change will be described below.

Table 1 shows values obtained by integrating luminous energy at period T64. a represents values at T64 in FIGS. 49A–51A. Similarly, b corresponds to values at T64 in FIGS. 49B–51B, c to those at T64 in FIGS. 49C–51C and d to those at T64 in FIGS. 49D–51D.

TABLE 1

| Temperature [°C.] | $f_H$ [KHz] | a | b | c | d | $e = \frac{a}{b}$ | $f = \frac{c}{d}$ |
|---|---|---|---|---|---|---|---|
| 53 | 150 | 4.6 | 3.5 | 4.6 | 3.5 | 1.31 | 1.31 |
| 51 | " | 4.6 | 3.2 | 4.6 | 3.1 | 1.44 | 1.48 |
| 48 | " | 4.6 | 2.8 | 4.6 | 2.6 | 1.64 | 1.77 |
| 46 | " | 4.5 | 2.4 | 4.5 | 2.2 | 1.88 | 2.05 |
| 44 | " | 4.5 | 2.1 | 4.6 | 1.1 | 2.14 | 4.18 |
| 43 | " | 3.5 | 2.2 | 4.6 | 0.8 | 1.59 | 5.75 |

When attention is paid to columns e=a/b and f=c/d in Table 1, change of the contrast can be understood. The above is characteristics gained when $f\mu=150$ KHz.

The value of $f_H$ is changed by temperature in the present invention.

TABLE 2

| Temperature [°C.] | $f_H$ [KHz] | a | b | c | d | $e = \frac{a}{b}$ | $f = \frac{c}{d}$ |
|---|---|---|---|---|---|---|---|
| 53 | 313 | 4.5 | 1.7 | 4.5 | 1.8 | 2.65 | 2.50 |
| 51 | 238 | 4.6 | 1.8 | 4.6 | 1.9 | 2.55 | 2.42 |
| 48 | 170 | 4.6 | 1.9 | 4.7 | 2.0 | 2.42 | 2.35 |
| 46 | 141 | 4.7 | 2.0 | 4.8 | 2.2 | 2.35 | 2.18 |
| 44 | 126 | 4.6 | 2.1 | 4.7 | 2.1 | 2.19 | 2.24 |
| 43 | 120 | 4.6 | 2.3 | 4.7 | 2.1 | 2.00 | 2.24 |

Table 2 shows characteristics measured at optimum $f_H$, changing $f_H$ according to temperature. As apparent from comparison between Tables 1 and 2, reduction of the contrast can be prevented when the frequency of $f_H$ is made higher as the temperature of the liquid crystal micro-shutters rises to 53° C. and then 58° C., for example.

Figure 52:
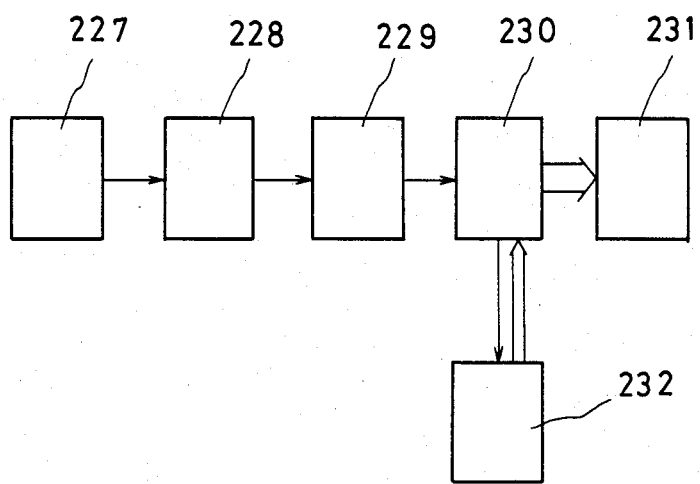
FIG. 52 is a block diagram showing an embodiment of the present invention.

FIG. 52 is a block diagram showing the second embodiment of the present invention. 227 represents a temperature sensor such as the thermistor and thermocouple which is attached to the liquid crystal light shutter 34. The signal of the temperature sensor 227 is amplified by an amplifier 228 and inputted to a voltage-controlled oscillator 229 (which will be hereinafter referred to as VCO). The VCO 229 changes its output frequency on the basis of temperature detected by the temperature sensor 227. It is better as the relation between temperature and output frequency becomes more approximate to Table 2, but it is not needed that they coincide accurately with each other. 230 represents a liquid crystal light shutter driving circuit, which uses the output frequency of the VCO 229 as $f_H$ of signals applied to micro-shutters 231. A drive control circuit 232 applies signals to the liquid crystal light shutter 230 to control start and finish of printing operation.

Although $f_H$ is changed in stepless manner by the VCO 229 in this example, it is not necessary to successively change $f_H$ but it may be arranged that $f_H$ is supplied in three steps.

It is supposed in the case of the VCO that a limiter is added to control the upper and lower limit of $f_H$.

As described above, the micro-shutters can be controlled to provide high contrast and excellent response characteristics in a wide temperature range, when the temperature of the liquid crystal light shutter 34 is detected to make the micro-shutter driving waveform $f_H$ variable.

In other words, it becomes possible to relatively roughly control the temperature of the liquid crystal light shutter, thereby enabling the stability of the recording apparatus to be enhanced.

Figure 53:
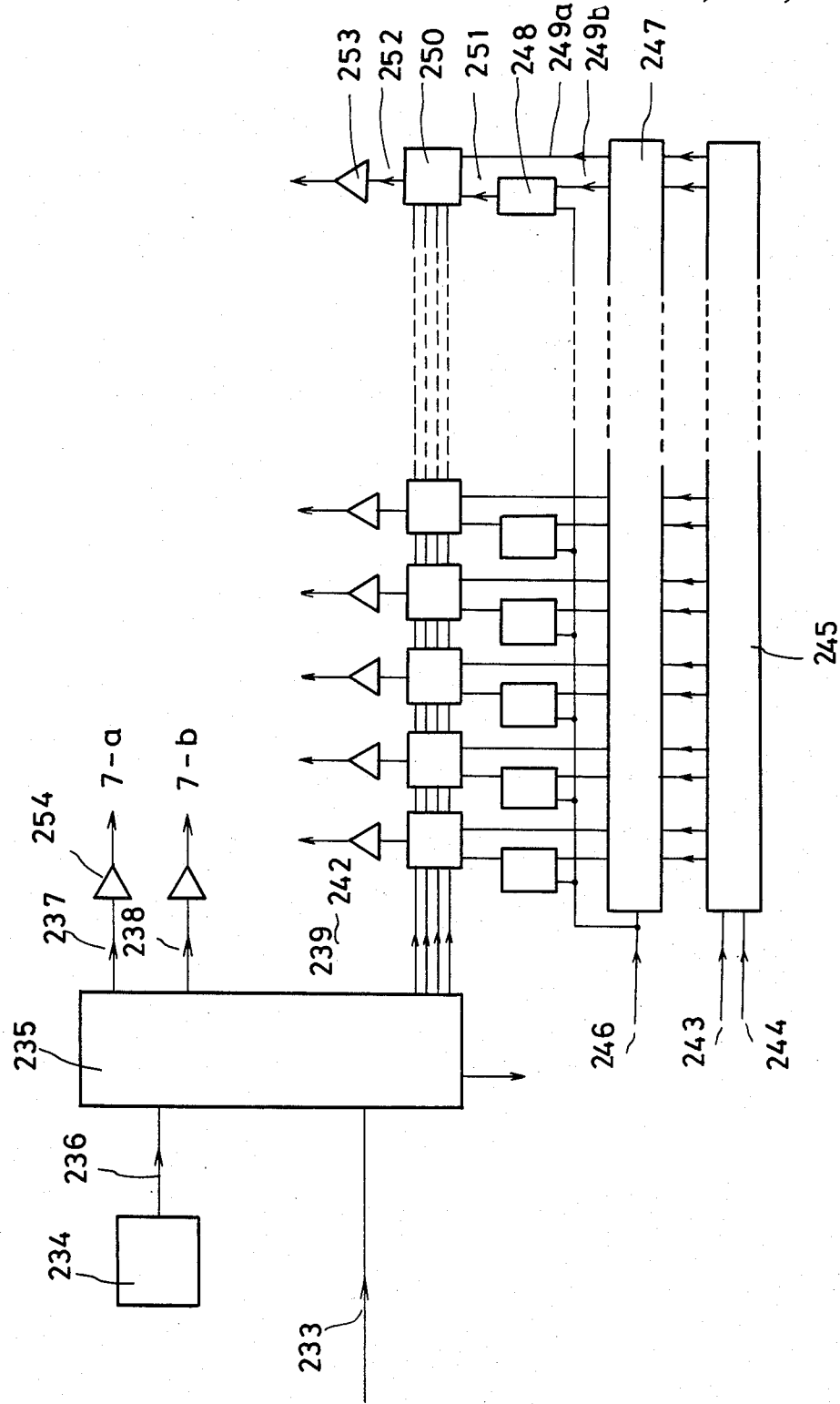
FIG. 53 is a block diagram showing a driver circuit for use to the micro-shutters in FIG. 52.

FIG. 53 is a circuit diagram showing the liquid crystal light shutter driving circuit 230 in FIG. 52. Numeral 233 denotes the $f_H$ signal. The $f_H$ signal was conventionally produced by the oscillator in the circuit, but it is inputted from the VCO and the like in the case of this embodiment of the present invention.

Numeral 234 represents a low frequency oscillator and $f_L = 5$ KHz in this case. A waveform generator 235 generates logic level signals (TTL or CMOS level) 237–242, which correspond to those 217–222 in FIG. 46A, on the basis of the $f_L$ and $f_H$ signals 236 and 233. At the same time, it generates Tw signal which corresponds to one writing cycle, and outputs this signal to the drive control circuit 232.

On the other hand, video data which correspond to white and black dots are inputted in serial from the drive control circuit 232 to a shift register 245 through a video data shift clock 244. This serial input includes data which correspond to one line in the main scanning direction, and its operation is finished within one writing cycle Tw.

A latch pulse 246 is inputted to a data latch 247 and a flip-flop 248 every one Tw, thereby causing the video data, which have been inputted to the shift register 245 and which correspond to one line, to be shifted to the data latch 247.

After the video data are shifted to the data latch 247, the shift register 245 starts shifting a next one line data. Synchronizing with a latch pulse, uneven-numbered data 249a of the video data which have already been in the data latch 247 are inputted directly to a data selector 250, while even-numbered data 249b thereof are inputted to the flip-flop 248. The data which have been inputted to the flip-flop 248 are inputted to a data selector 251, responsive to a next latch pulse. In short, even-numbered data are delayed by one writing cycle Tw from uneven-numbered data when they are inputted to the data selectors. This is because the write selecting electrodes are two units and recording dots are arranged in zigzag, as shown in FIG. 28.

Namely, the micro-shutters on the side of the write selecting electrode 124 are opened and closed at the first half of the writing cycle Tw, corresponding to uneven-numbered data line, while the micro-shutters 137 on the side of the write selecting electrode 125 are opened and closed after ½Tw since then, corresponding to even-numbered data line which is just before the uneven-numbered data line.

When the interval between the micro-shutters 136 and 137 is made wide, therefore, it may be arranged that the number of the flip-flops is increased to form 2, 3 and more stages and that even-numbered data are inputted to the data selector 250 after they are delayed by 2-, 3- and more-Tw. The data selector 250 selects one of signals 239–242, depending upon four states (249a and 251 are 1 and 1, 1 and 0, 0 and 1, and 0 and 0) which are determined by the video data 249a and the delayed video data 251. It is assumed that 1 corresponds to black and 0 to white, the signal 239 is selected under the state of 1,1 signal 240 under the state of 1, 0, signal 241 under the state of 0, 1 and signal 242 under the state of 0, 0. A signal 252 selected is inputted to a high pressure-tight buffer 253 and its amplitude becomes from logic level to drive level for liquid crystal. This drive level signal is associated with the waveforms 217 and 218 which are similarly amplified by a high pressure-tight buffer 254, to apply waveforms 223–226 in FIG. 47 to the liquid crystal so as to open and close the micro-shutters.

According to this embodiment of the present invention, there can be provided a recording apparatus having the liquid crystal light shutter whose liquid crystal can be relatively roughly controlled of its temperature and display high contrast and excellent response characteristic in a wide temperature range, as described above.

The above is related to the second embodiment of the present invention wherein the time division drive of the present invention can be effectively achieved even when the liquid crystal light shutter 34 is changed in temperature. The shape or contour of the plural micro-shutters which are included in the liquid crystal light shutter 34 will be described below.

Figure 54:
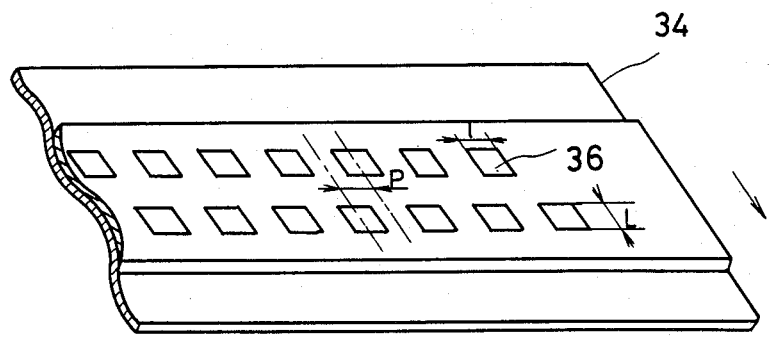
FIG. 54 shows the arrangement of a liquid crystal light shutter.

FIG. 54 shows an arrangement of the liquid crystal light shutter 34, on which two lines of micro-shutters 36 are arranged in zigzag. The photoreceptor 17 rotates in the direction shown by an arrow in FIG. 54 and the length l of a micro-shutter when viewed in a direction crossing the arrow direction is substantially same as the length of a pitch p because it is desirable that image ends of the adjacent micro-shutters 36 coincide with each other. The length L of a micro-shutter 36 when viewed in the arrow direction is an element of the embodiment.

Figure 55:
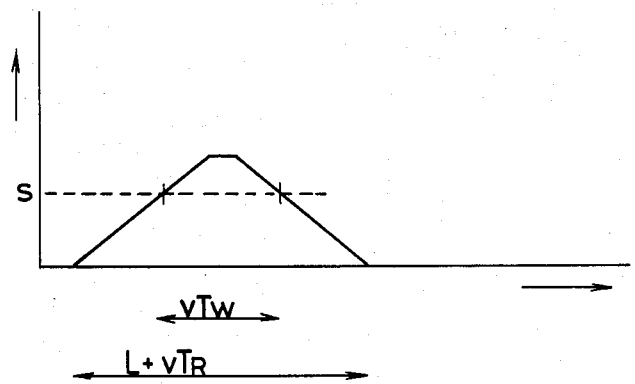
FIGS. 55 and 57 show the characteristics of light amount.

It is assumed, as shown in FIG. 55, that the micro-shutters 36 are opened for a time $T_L$ to record an image on the photoreceptor 17. Since the photoreceptor 17 moves at a speed v, the area of the photoreceptor 17 which is light-irradiated through the micro-shutters 36 becomes $L + vT_r$.

It is preferable that the length L of a micro-shutter 36 in FIG. 54 coincides with the distance $L = vTw$ which the photoreceptor 17 moves during one writing cycle, and a white dot which has an appropriate length as a finally-recorded image can be obtained by determining the threshold value S of luminous energy.

Figure 56:
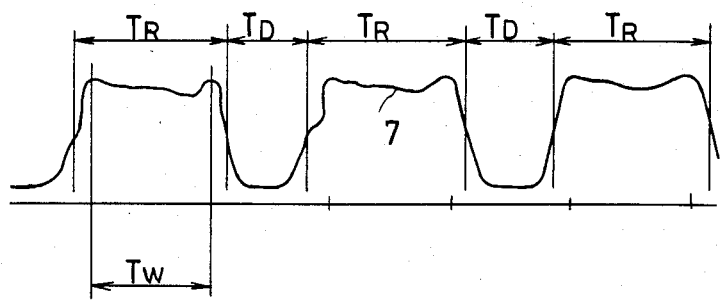
FIG. 56 shows a white and black image recorded.
Figure 57:
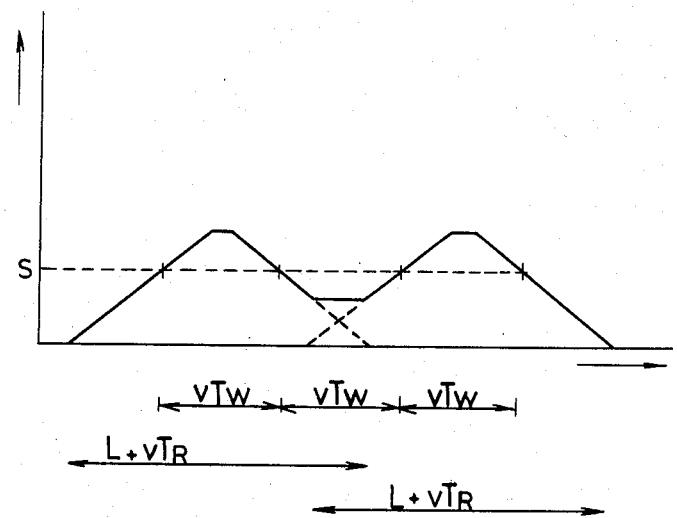

In the case where the liquid crystal light shutter which uses the usually-closed liquid crystal is driven by the double-frequency drive, as shown by the first embodiment of the present invention, so as to open and close the micro-shutters 36, the opening signal is necessarily applied every one writing cycle Tw to reduce the accumulated response effect. Therefore, the time Tr during which the shutters are really opened becomes longer than the writing cycle Tw, as shown in FIG. 56. When a case where continuous recording is made in the order of white, black and white every writing cycle under this drive is considered, the area of the photoreceptor 17 which is lighgt-irradiated to record the first white dot is overlapped with that area of the photoreceptor 17 which is light-irradiated to record the last white dot, as shown in FIG. 57. As the result, the black dot between the white dots is reduced in its black density, as compared with the black dot among continuously-recorded black dots. In order to eliminate this density difference, it is necessary to prevent the overlap of areas. The length of the overlapped areas in FIG. 56 corresponds to a length of L+vTr overlapped by another length of L+vTr, as shown in FIG. 56.

Namely, the state under which the density difference is eliminated can be realized by using a micro-shutter 36 whose length L is 2vTw>L+Tr. Therefore, it is necessary that the length L of the micro-shutter 36 of the present invention is shorter than v(2Tw−Tr), and when the micro-shutter 36 is made to have this length L, black dots which have no density difference one another can be obtained.

Figure 58:
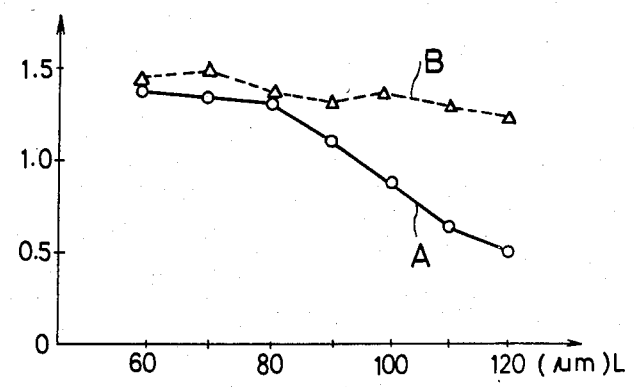
FIG. 58 shows a density difference between white and black.

FIG. 58 shows test results conducted in the case where the liquid crystal light shutter 34 is driven by the double-frequency drive, using the micro-shutters 36 of the present invention.

When opening and closing drive was carried out by driver waveforms to which the opening signal was necessarily applied every Tw, which was assumed to be 2 msec, Tr was 2.35 msec. White and black density differences were gained using the photoreceptor 17 which rotates at a speed of 50 mm/sec, and changing the length L of the micro-shutter 36 from 60 μm to 120 μm. Micro-density meter, PDM - 5 (made by Konishiroku Photographical Industry) was used to measure white and black density difference of an image.

A curve A in FIG. 58 represents density differences in a case of alternately repeating white and black every dot, while another curve B denotes density differences in a case of repeating white and black every two dots. When the length L is shorter than 80 μm, no difference is caused between the case of repeating white and black every one dot and the case of repeating them every two dots, but when the length L becomes longer than 90 μm, the curve A which represents the density differences of white and black arranged every one dot falls quickly.

When substituted by the above-cited values, the length L becomes smaller than 82.5 μm and these test results coincide with the theory of the present invention.

According to the present invention as described above, there can be provided an optical recording apparatus in which the liquid crystal light shutter is incorporated to perform optical writing regardless of the brightness of light source. In addition, the optical recording apparatus which is sufficiently high in recording density, speed and quality can be small-sized and made low in cost with high reliability.

Further, the temperature control of liquid crystal can be made relatively roughly even when environmental temperature changes, and the recording apparatus can be therefore provided with a response characteristic which displays high contrast in a wide temperature range. In addition, warm-up time of the liquid crystal can be shortened.

Furthermore, when the recording apparatus of the present invention is used, the capacity of reproducing images can be enhanced, and particularly density difference between a black picture element isolated among white image elements ahd the successively recorded black image elements can be eliminated, so that excellent images having clear contour in the case of graphic information and the like but no irregularities in halftone can be obtained.

What is claimed is:

1. Recording apparatus for optically writing on a photoreceptor in correspondence with image signals to be recorded comprising:
   (a) a light source for producing light;
   (b) a liquid crystal shutter for selectively transmitting light from said source;
   (c) means for focusing light transmitted by said liquid crystal shutter onto the photoreceptor;
   (d) said liquid crystal shutter being composed of a first transparent substrate provided with n-units of write selecting electrodes, a second transparent substrate provided with a plurality of recording signal electrodes which cross and are opposite the n-units of the write selecting electrodes, and a liquid crystal agent sealed between both substrates and whose dielectric anisotrophy becomes zero at a specified frequency $f_C$, said write selecting and recording signal electrodes being provided with micro-shutters at the crossings therebetween;
   (e) a first supply means for supplying to the n units of the write selecting electrodes, write selecting signals having a frequency $f_H$ higher than said specified frequency $f_C$, and a frequency $f_L$ lower than said specified frequency $f_C$ such that the phase of successive write selecting signals reverses after a time period Tw/n which is 1/n of the write cycle time Tw; and
   (f) a second supply means, responsive to said image signals, for supplying to the recording signal electrodes, recording signals of frequencies $f_H$ and $f_L$ having amplitudes that are the same as the amplitudes of said write selecting signals;
   (g) said first and second supply means being constructed and arranged such that during a selection period, in which a micro-shutter is selected by the write selecting signals, superposed driver signals are applied to the selected micro-shutter, said driver signals having either (i) the frequencies $f_L$ and $F_H$ throughout the selection period, or (ii) the frequency $f_H$ near the start of a selection period and of the frequencies $f_L$ and $f_H$ near the end of a selection period for establishing the on-off state of the selected micro-shutter; (h) said first and second supply means being further constructed and arranged such that, during a non-selection period in which a micro-shutter is not selected by the write selecting signals, said driver signals applied to a non-selected micro-shutter have the frequency $f_L$ near the end of a non-selection period and either (i) the frequencies $f_L$ and $f_H$ near the beginning of of a non-selection period, or (ii) no frequency near the beginning of a non-selection period for establishing the on-off state of the non-selected micro-shutter during a preceeding selection period.

2. Recording apparatus according to claim 1 wherein:

(a) said second supply means is constructed and arranged to produce recording signals that have (i) the certain frequency $f_L$ throughout a period $Tw/n$, or (ii) the certain frequency $f_H$ near the start of a period $Tw/n$ and signals of the certain frequency $f_L$ near the end of a period $Tw/n$; and (b) said first supply means is constructed and arranged to produce write selecting signals that have (i) the frequency $*f_H$ throughout a selection period, where $*f_H$ is a frequency opposite in phase to the certain frequency $f_H$, or (ii) the frequency $*f_L$ near the end of a non-selection period, where $*f_L$ is a frequency opposite in phase to the certain frequency $f_L$, and the frequency $f_H$ elsewhere during the non-selection period.

3. Recording apparatus according to claim 1 wherein $n = 2$.

4. Recording apparatus according to claim 1 wherein said liquid crystal is of the guest-host type in which coloring matter is dissolved.

5. Recording apparatus according to claim 1 wherein said first and second supply means have temperature detecting means for detecting the temperature of said liquid crystal shutter, and variable means for changing the frequency $f_H$ in response to the output of said temperature means.

6. Recording apparatus according to claim 1, wherein said photoreceptor is movable, and the length of said each micro-shutter when viewed in the moving direction of said photoreceptor is made shorter than $v(2Tw - T_R)$ where $v$ is the moving speed of said photoreceptor and $T_R$ is the substantial open period of said micro-shutter when on-signals are applied thereto.

7. A recording apparatus according to claim 2 wherein n is 2.

8. A recording apparatus according to claim 2 wherein said liquid crystal agent is of the guest-host type in which a coloring matter is solved.

9. Recording apparatus according to claim 2 wherein said first and second supply means have temperature detecting means for detecting the temperature of said liquid crystal shutter, and variable means for changing the frequency $f_H$ in response to the output of said temperature means.

10. Recording apparatus according to claim 2, wherein said photoreceptor is movable, and the length of said each micro-shutter when viewed in the moving direction of said photoreceptor is made shorter than $v(2Tw - T_R)$ where $v$ is the the moving speed of said photoreceptor and $T_R$ is the substantial open period of said micro-shutter when on-signals are applied thereto.

* * * * *

UNITED STATES PATENT AND TRADEMARK OFFICE
CERTIFICATE OF CORRECTION

PATENT NO. : 4,641,156

Page 1 of 3

DATED : February 3, 1987

INVENTOR(S) : Morio OHTA et al.

It is certified that error appears in the above-identified patent and that said Letters Patent is hereby corrected as shown below:

In the Abstract, in line 5, "matrial" should be changed to ---material---;

At column 1, line 30, "can done" should be changed to ---can be done---;

At column 1, line 57 of the printed patent, "crtstal" should be changed to ---crystal---;

At column 1, line 68 of the printed patent, "disolving" should be changed to ---dissolving---;

At column 2, line 37 of the printed patent, "disolving" should be changed to ---dissolving---;

At column 2, line 42 of the printed patent, "at the both" should be changed to ---at both---;

At column 3, line 11 of the printed patent, "anisotroy" should be changed to ---anisotropy---;

At column 3, line 24, "anisotroy" should be changed to ---anisotropy---;

At column 3, line 48, "disolved" should be changed to --- dissolved---;

At column 7, line 30, "block" should be changed to ---black---;

At column 7, line 32, after "arrange", ---after--- should be inserted;

At column 7, line 38, ---;--- should be inserted after "comprising";

At column 7, line 39, ---a--- should be inserted before "liquid";

At column 7, line 47, ---,--- should be inserted after "electrodes";

UNITED STATES PATENT AND TRADEMARK OFFICE
CERTIFICATE OF CORRECTION

PATENT NO. : 4,641,156

DATED : February 3, 1987

INVENTOR(S) : Morio OHTA et al.

It is certified that error appears in the above-identified patent and that said Letters Patent is hereby corrected as shown below:

At column 7, line 48, ---,--- should be inserted after "another";

At column 7, line 54, "a" should be changed to ---at---;

At column 8, line 3, "those of liquid, crystal" should be changed to ---show those of liquid crystal---;

At column 9, line 68, "an" should be changed to ---a---;

At column 10, line 6, "informtion" should be changed to ---information---;

At column 10, line 51, "recroding" should be changed to ---recording---;

At column 13, line 52, "66" should be changed to ---69---;

At column 14, line 50, after "In addition,", ---the liquid crystal light shutter of GH type uses a--- should be inserted;

At column 16, line 11, "micro-shuttes" should be changed to ---mirco-shutters---;

At column 20, line 53, "a" should be deleted before "mixed";

At column 21, line 30, "(1-  )Tw" should be changed to ---(1-1/3)Tw---;

At column 21, line 30, "92a" should be changed to ---192a---;

At column 21, line 41, "170Tw-$T_L$" should be changed to ---2/3 Tw-$T_L$---;

UNITED STATES PATENT AND TRADEMARK OFFICE
CERTIFICATE OF CORRECTION

PATENT NO. : 4,641,156

DATED : February 3, 1987

INVENTOR(S) : Morio OHTA et al

It is certified that error appears in the above-identified patent and that said Letters Patent is hereby corrected as shown below:

At column 22, line 44, "ih" should be changed to ---in---;
At column 23, line 20, "liqhid crtstal" should be changed to ---liquid crystal---;
At column 23, line 26, "becomes" should be changed to ---become---;
At column 28, line 8, "ahd" should be changed to ---and---;
At column 28, line 56, "(h)" should be moved to the next paragraph; and
At column 28, line 63, "of" (second occurrence) should be deleted.

Signed and Sealed this

Eighteenth Day of October, 1988

*Attest:*

DONALD J. QUIGG

*Attesting Officer*     *Commissioner of Patents and Trademarks*